(12) United States Patent
Kuwahara

(10) Patent No.: US 8,437,438 B2
(45) Date of Patent: May 7, 2013

(54) DIVERSITY RECEPTION DEVICE

(75) Inventor: Yoshihiko Kuwahara, Hamamatsu (JP)

(73) Assignee: National University Corporation Shizuoka University, Shizuoka-shi (JP)

( * ) Notice: Subject to any disclaimer, the term of this patent is extended or adjusted under 35 U.S.C. 154(b) by 0 days.

(21) Appl. No.: 13/382,566

(22) PCT Filed: Jul. 7, 2010

(86) PCT No.: PCT/JP2010/061558
§ 371 (c)(1),
(2), (4) Date: Jan. 16, 2012

(87) PCT Pub. No.: WO2011/004849
PCT Pub. Date: Jan. 13, 2011

(65) Prior Publication Data
US 2012/0099682 A1 Apr. 26, 2012

(30) Foreign Application Priority Data
Jul. 7, 2009 (JP) ................................. 2009-160982

(51) Int. Cl.
*H04B 7/10* (2006.01)
*H04L 27/06* (2006.01)
(52) U.S. Cl.
USPC .......................................... 375/347; 375/343
(58) Field of Classification Search .................. 375/343, 375/347, 340, 346, 316
See application file for complete search history.

(56) References Cited

U.S. PATENT DOCUMENTS

| 2004/0198229 A1* | 10/2004 | Hirata ........................... 455/63.4 |
| 2006/0166634 A1* | 7/2006 | Ido ............................... 455/277.1 |
| 2009/0060106 A1* | 3/2009 | Kuramoto ..................... 375/347 |
| 2010/0118826 A1* | 5/2010 | Chong et al. .................. 370/330 |

FOREIGN PATENT DOCUMENTS

| JP | 2004 32648 | 1/2004 |
| JP | 2005 348278 | 12/2005 |
| JP | 2008 66948 | 3/2008 |
| JP | 2008 160357 | 7/2008 |

OTHER PUBLICATIONS

Mailloux, R.J., "Phased Array Theory and Technology," Proceeding of the IEEE, vol. 70, No. 3, pp. 246-291 (Mar. 1982).

(Continued)

*Primary Examiner* — David C. Payne
*Assistant Examiner* — Brian J Stevens
(74) *Attorney, Agent, or Firm* — Oblon, Spivak, McClelland, Maier & Neustadt, L.L.P.

(57) ABSTRACT

A diversity reception device includes a power combiner to combine electric powers of OFDM signals, each OFDM signal being received by a first antenna and second antenna, a switch to change connections between branched output-ports of the first and second antennas, in mid-stream of effective symbol periods, the effective symbol periods are assigned respectively in each of symbol periods of the OFDM signals, a receiver to demodulate the OFDM signals, a phase shifter to shift phases of the OFDM signals received by the second antenna, and an arithmetic and control processing circuit to calculate complex correlation coefficient between a guard interval, assigned in each of the symbol periods associated with the first antenna, and a copy-source interval, assigned in each of the symbol periods associated with the second antenna, and to determine rotation angle on the basis of the complex correlation coefficient.

12 Claims, 20 Drawing Sheets

OTHER PUBLICATIONS

Kuwahara, Y., et al., "Development of a Simple Adaptive Antenna for Mobile FM Radio," Transactions of the Institute of Electronics, Information and Communication Engineers B, vol. J91-B, No. 1, pp. 79-87, (Jan. 1, 2008).

Ohira, T., et al., "Electronically Steerable Parasitic Array Radiator Antenna," Transactions of the Institute of Electronics, Information and Communication Engineers C, vol. J87-C, No. 1, pp. 12-31 (Jan. 1, 2004).

International Search Report Issued Aug. 31, 2010 in PCT/JP10/61558 Filed Jul. 7, 2010.

English Translation of the International Preliminary Report on Patentability issued Feb. 23, 2012, in PCT/JP2010/061558.

English Translation of the Written Opinion of the International Searching Authority issued Aug. 31, 2010, in PCT/JP2010/061558.

* cited by examiner

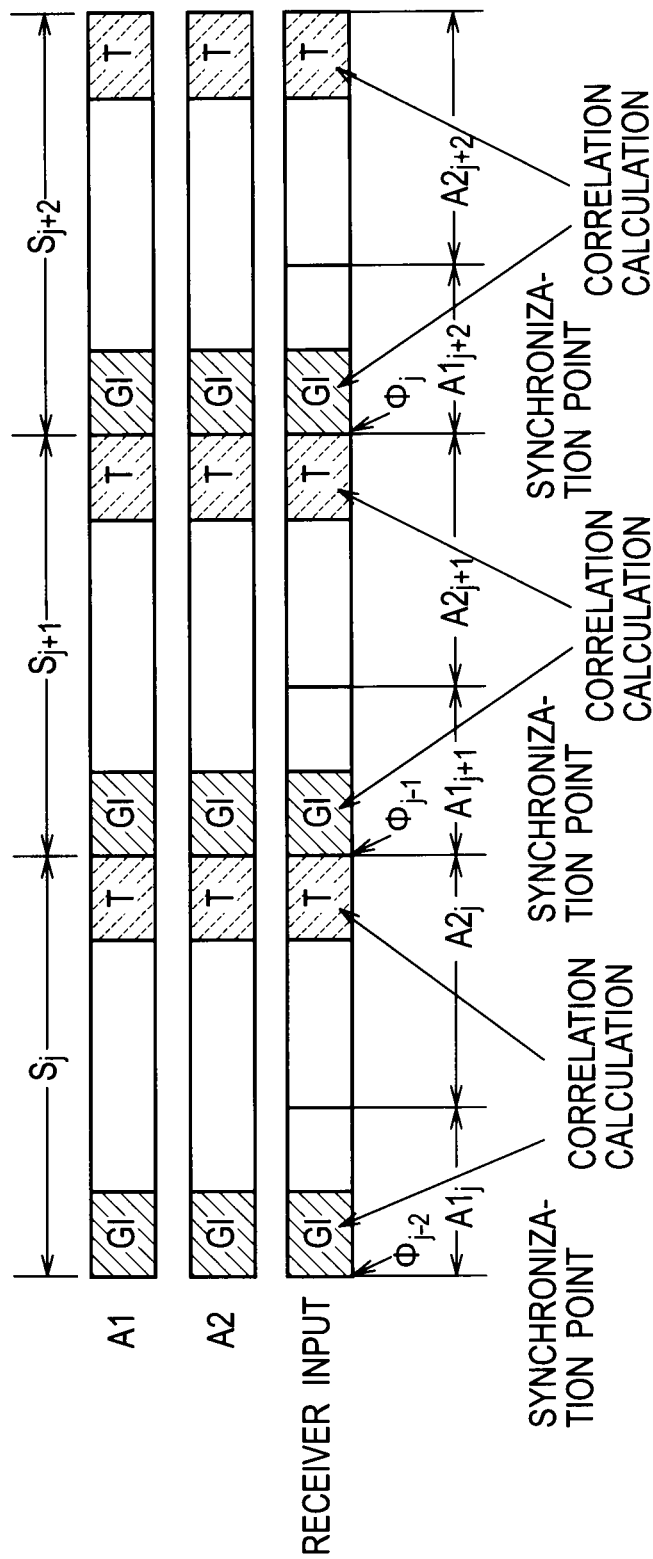

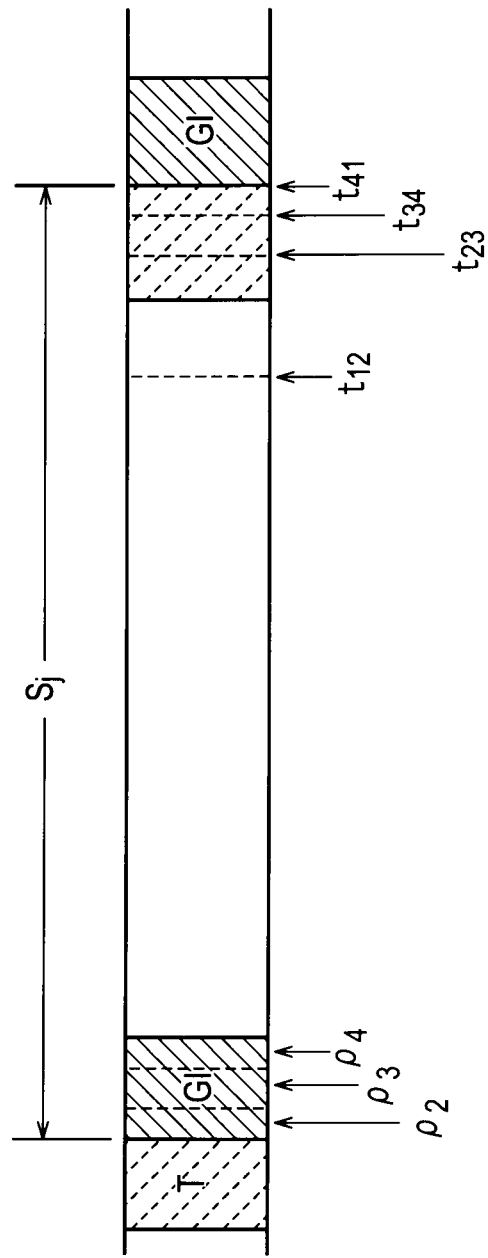

DIVERSITY RECEPTION DEVICE

TECHNICAL FIELD

The present invention pertains to diversity reception devices, and more particularly relates to diversity reception devices that are preferable for digital terrestrial broadcast tuners for vehicle installations.

BACKGROUND ART

In a digital terrestrial hi-vision broadcast tuner for a vehicle installation, when the tuner suffers in a degraded reception state, which disables the reception of normal twelve-segments broadcasting system (hereafter, abbreviated as "a 12-seg broadcast"), the 12-seg broadcast is automatically switched to the reception scheme of a one-segment broadcasting system (hereafter, abbreviated as "a one-seg broadcast"), which is modulated by a broadcast system immune to the fading phenomena. Integrated Services Digital Broadcasting-Terrestrial (ISDB-T) approach, which is admitted as a Japanese standard for broadcast, based on the enforcement of the provision of the Japanese Radio Law Article 38, by using UHF frequency band, divides one-channel of 6 MHz band into twelve-segments for fixed receptions and one-segment for a portable reception, and consequently achieves broadcast transmissions. In the ISDB-T approach, orthogonal frequency division multiplexing (OFDM) is used as a multiplexing system, and 16-state quadrature amplitude modification (16QAM), 64-state quadrature amplitude modulation (64QAM), quadriphase-shift keying (QPSK) and differential quadriphase-shift keying (DQPSK) are used as modulation systems, respectively. Also, in order to correspond to various broadcasting approaches in future, as transmission parameters, there are mode-I to mode-III, in which OFDM carrier spacing are different.

When watching digital terrestrial broadcasts in moving vehicles, fading changes reception electric fields severely. For this reason, diversity reception is indispensable to digital terrestrial broadcast tuners mounted in vehicles. In particular, in a tuner for 12-seg broadcast reception, a phase synthetic diversity by using digital beamforming (DBF) is used in order to secure a high carrier-to-noise power ratio (CNR). In the phase synthetic diversity with DBF, receivers whose number is equal to the number of antennas are required. Thus, the digital terrestrial broadcast tuners for vehicles are marketed at prices equal to three to four times that of digital terrestrial broadcast tuners for home use. Also, when DBF is mounted in mobile apparatuses such as a note PC and the like, electric power consumption is increased, which results in a problem that a viewable time becomes short.

As variable directional antennas, which require only single reception system, there are a phased array (see patent literature (PTL) 1 and patent literature (NPL) 2), load reflection current control type adaptive antenna (see NPL 2), Electronically Steerable Passive Array Radiator (ESPAR) antenna (see NPL 3) and the like. In those antennas, reception signal of each element cannot be directly observed, which consequently requires the use of blind algorism for weight search. Typically, in many cases, since the blind algorism is long in convergence time, application of the blind algorism to high-speed movements is difficult. Also, trial operations of phase shifters are required in the phased array, and trial operations of variable reactors are required in ESPAR antenna so as to execute the weight search. Because these trial operations correspond to channel changes in reception branches, the application of the blind algorism to the reception in the ISDB-T system causes problems such as loss of symbol synchronization and degrade of BER characteristics.

CITATION LIST

Patent Literature

PTL 1: JP 2004-32648A

Non-Patent Literature

NPL 1: ROBERT J. MAILLOUX, "Phased Array Theory and Technology", Proceedings of the IEEE, Vol. 70, No. 3, March 1982, p. 246-291

NPL 2: Yoshihiko KUWAHARA, Yusuke Suzuki, Kenji URA, "Development of a Simple Adaptive Antenna for Mobile FM Radio", Transactions of the Institute of Electronics, Information and Communication Engineers B, Vol. J91-B, No. 1, January 2008, p. 79-87

NPL 3: Takashi OHIRA, Kyouichi IIGUSA, "Electronically Steerable Parasitic Array Radiator Antenna", Transactions of the Institute of Electronics, Information and Communication Engineers C, Vol. J87-C, No. 1, January 2004, p. 12-31

SUMMARY OF INVENTION

Technical Problem

An object of the present invention is to provide a diversity reception device, in which its structure is simple, and without any use of the blind algorism, bit error rate (BER) is improved, and carrier synchronization is not required, and even if sampling is carried out at a speed of a sampling theorem or less, diversity effectiveness can be expected.

Solution to Problem

In order to achieve the above-mentioned object, a first aspect of the present invention inheres in a diversity reception device, encompassing (a) a first antenna serving as a reference antenna, (b) a second antenna serving as an antenna-to-be-measured, (c) a power combiner configured to combine electric powers of OFDM signals respectively, each of the OFDM signals being received by the first and second antennas, (d) a digital terrestrial broadcast tuner connected to an output side of the power combiner, (e) a switch configured to change connections between branched output-ports of the first and second antennas, in mid-stream of effective symbol periods, the effective symbol periods are assigned respectively in each of symbol periods of the OFDM signals, (f) a receiver connected to an output side of the switch, configured to demodulate the OFDM signals, (g) a phase shifter connected to an output side of the second antenna, configured to shift phases of the OFDM signals received by the second antenna, and to transfer the phase-shifted OFDM signals to the power combiner, and (h) an arithmetic and control processing circuit, after accepting the demodulated OFDM signals, configured to calculate complex correlation coefficient between a guard interval, which is assigned in each of the symbol periods associated with the first antenna, and a copy-source interval, which is assigned in each of the symbol periods associated with the second antenna, and to determine rotation angle on a complex plane on the basis of the complex correlation coefficient, and to transfer phase-shift signal to the phase shifter so that the phase shifter can shift the phase by amount of the rotation angle.

A second aspect of the present invention inheres in a diversity reception device, encompassing (a) a reference antenna, (b) a plurality of antennas-to-be-measured, (c) a power combiner configured to combine electric powers of OFDM signals respectively, each of the OFDM signals being received by the reference antenna and the plurality of antennas-to-be-measured, (d) a digital terrestrial broadcast tuner connected to an output side of the power combiner, (e) a switch configured to change connections between branched output-ports of the reference antenna and any of the plurality of antennas-to-be-measured, in mid-stream of effective symbol periods, the effective symbol periods are assigned respectively in each of symbol periods of the OFDM signals, (f) a receiver connected to an output side of the switch, configured to demodulate the OFDM signals, (g) a plurality of phase shifters connected respectively to output sides of the plurality of antennas-to-be-measured, configured to shift respectively phases of the OFDM signals, which are received by the plurality of antennas-to-be-measured, and to transfer the phase-shifted OFDM signals to the power combiner, respectively, and (h) an arithmetic and control processing circuit configured to perform a sequence of processes against the plurality of antennas-to-be-measured, respectively, after accepting the demodulated OFDM signals. The sequence of processes includes a process of calculating complex correlation coefficient between a guard interval, which is assigned in each of the symbol periods associated with the first antenna, and a copy-source interval, which is assigned in each of the symbol periods associated with any of corresponding antennas-to-be-measured, a process of determining rotation angle on a complex plane on the basis of the complex correlation coefficient, and a process of transferring phase-shift signal to a phase shifter connected to corresponding antennas-to-be-measured so that the phase shifter connected to the corresponding antennas-to-be-measured can shift the phase by amount of the rotation angle.

ADVANTAGEOUS EFFECTS OF INVENTION

According to the present invention, it is possible to provide the diversity reception device, in which its structure is simple, and without any use of the blind algorism, the bit error rate (BER) is improved, and the carrier synchronization is not required, and even if the sampling is carried out at the speed of the sampling theorem or less, the diversity effectiveness can be expected.

BRIEF DESCRIPTION OF DRAWINGS

FIG. 1B is a time chart, which in the diversity reception device pertaining to the first embodiment illustrated in FIG. 1A, describes a timing when a phase compensation is carried out, by switching between a first antenna and a second antenna for each of symbol periods and calculating a complex correlation coefficient between a guard interval of the first antenna and a copy-source interval of the second antenna.

FIG. 20 is a time chart describing a behavior of a quadruple-branch diversity reception device pertaining to a fourth embodiment, which carries out the phase compensations of three antennas-to-be-measured in a single symbol period.

DESCRIPTION OF EMBODIMENTS

Figure 1A:
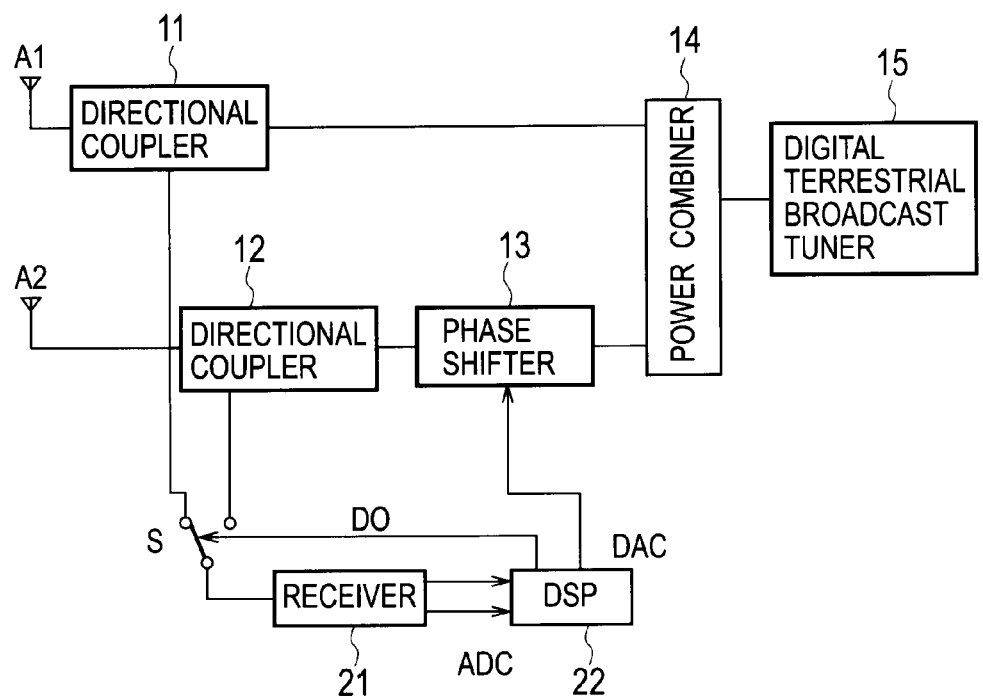
FIG. 1A is a schematic block-diagram describing an outline of a diversity reception device pertaining to a first embodiment of the present invention.

The first to fourth embodiments of the present invention will be described below with reference to the drawings. In the descriptions of the following drawings, the same or similar reference numerals are assigned to the same or similar portions. However, the drawings are diagrammatic, and attention should be paid to a fact that the configuration of the device and the like differ from the actual structure. Also, the following embodiments exemplify the devices and methods for embodying the technical ideas of the present invention, and the technical ideas of the present invention are not limited to the followings. Various changes can be added to the technical ideas of the present invention, within the technical range described in claims.

(Outline of Diversity Reception Device Pertaining to First Embodiment)

As illustrated in FIG. 1A, a diversity reception device pertaining to a first embodiment of the present invention encompasses: a first antenna A1 serving as a reference antenna; a second antenna A2 serving as an antenna-to-be-measured; a power combiner 14 for combining electric powers of OFDM signals that are received by the first antenna A1 and the second antenna A2, respectively; a digital terrestrial broadcast tuner 15 connected to an output side of the power combiner 14; a switch S configured to change connections between a branched output-port of the first antenna A1 and a branched output-port of the second antenna A2 for each of symbol periods, in mid-stream of the effective symbol period of the OFDM signal; a receiver 21 that is connected to an output side of the switch S and demodulates the OFDM signal; a phase shifter 13 that is connected to an output side of the second antenna A2 and shifts the phase of the OFDM signal received by the second antenna A2 and then outputs to the power combiner 14; and an arithmetic and control processing circuit 22 for accepting demodulated signals from the receiver 21 and transferring a signal for shifting the phase by amount corresponding to a rotation angle, to the phase shifter 13. A first directional coupler 11 is connected to the output side of the first antenna A1, and a part of the outputs of the first antenna A1 is branched to the switch S side. A second directional coupler 12 is connected to the output side of the second antenna A2, and a part of the outputs of the second antenna A2 is branched to the switch S side. To the power combiner 14, the part of the output-ports of the first antenna A1 is entered through the first directional coupler 11, and the part of the output-ports of the second antenna A2 is entered through the second directional coupler 12 and the phase shifter 13. As the arithmetic and control processing circuit 22, it is possible to use a microprocessor such as a digital signal processor (DSP) and the like. Then, a signal of the receiver 21 is AD-converted and entered to the arithmetic and E control processing circuit 22, and an output signal of the arithmetic and control processing circuit 22 is DA-converted and entered to the phase shifter 13. As each of the structures of the first antenna A1 and the second antenna A2, for example, it is possible to use: an external antenna such as a monopole antenna, a helical antenna and the like; and a built-in antenna such as a so-called inverted-F antenna of a planer inverted-F antenna (PIFA) approach, an antenna of a bent monopole approach, or a planar substrate antenna that uses a printed substrate in which a planner balun is implemented by a wiring pattern, or the like. However, the first antenna A1 and the second antenna A2 are not limited to a cylindrical electrical conductor bar, and various antennas including a planar antenna (patch antenna and the like) are included.

The digital terrestrial broadcast tuner 15 encompasses a tuner unit for selecting the OFDM signal transmitted by the power combiner 14 and down-converting the selected signal into a predetermined band, and known circuit configurations such as an A/D converter, an orthogonal detection circuit, a synchronizing circuit, a fast Fourier transform (FFT) circuit, an equalizing circuit, a de-interleave circuit, a correcting circuit and the like.

As illustrated in FIG. 1B, the OFDM signals in which guard intervals GI are provided in respective symbol periods $S_j$, $S_{j+1}$, - - - of inverse-discrete-Fourier-transformed signals are entered to the first antenna A1 and the second antenna A2. A period in which the interval length of the guard interval GI is subtracted from the interval length of each of the symbol periods $S_j$, $S_{j+1}$, - - - becomes the effective symbol period (observation window period). Each of the guard intervals GI is copied cyclically without any change, in which the waveform of the copy-source interval T in the second half of the effective symbol period in each of the symbol periods $S_j$, $S_{j+1}$, - - - is assumed to be a dummy signal.

Figure 2:
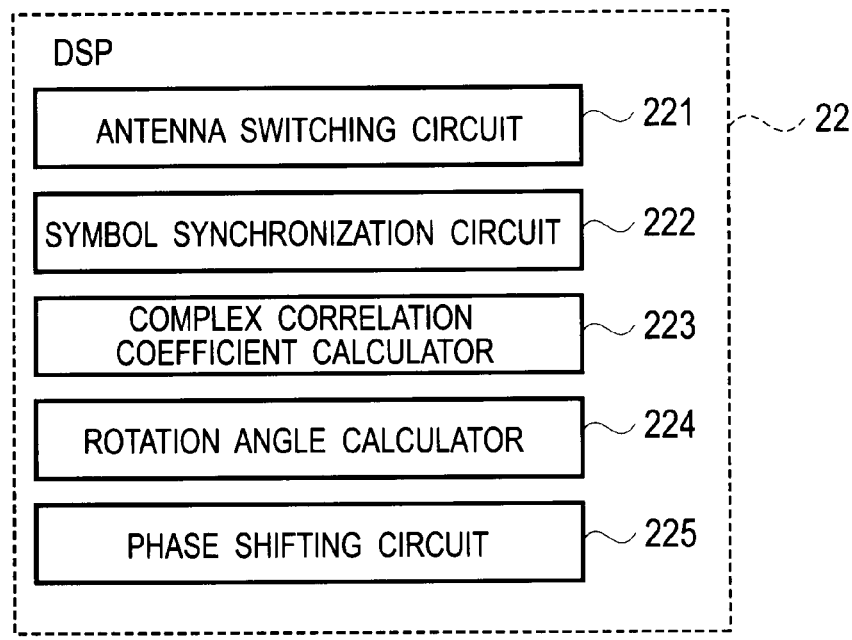
FIG. 2 is a block-diagram describing a logical structure of an arithmetic and control processing circuit that is used in the diversity reception device pertaining to the first embodiment.

The arithmetic and control processing circuit (DSP) 22 illustrated in FIG. 1A changes connections between the first antenna A1 and the second antenna A2 for each of the symbol periods $S_j$, $S_{j+1}$, - - - in the OFDM signal illustrated in FIG. 1B, and calculates a complex correlation coefficient ρ between the guard interval GI of the first antenna A1 and the copy-source interval T of the second antenna A2, and determines a rotation angle on a complex plane on the basis of the complex correlation coefficient, and then compensates the phase of the reception signal of the second antenna A2. For this reason, as illustrated in FIG. 2, the arithmetic and control processing circuit (DSP) 22 encompasses: an antenna switching circuit 221 that generates a signal for switching to either the first antenna A1 or the second antenna A2 and transmits to the switch S; a symbol synchronization circuit 222 for establishing a symbol synchronization via sliding correlation and the like; a complex correlation coefficient calculator 223 for calculating the complex correlation coefficient ρ between the guard interval GI of the first antenna A1 and the copy-source interval T of the second antenna A2, from the demodulated signal of the receiver 21; a rotation angle calculator 224 for determining the rotation angle on the complex plane on the basis of the complex correlation coefficient calculated by the complex correlation coefficient calculator 223; and a phase shifting circuit 225 that generates signals for shifting the phases of the reception signals from the second antenna A2 to the opposite direction, the signals shift the phases by amount of rotation angles calculated by the rotation angle calculator 224 and transmits to the phase shifter 13.

(Operational Example of Diversity Reception Device Pertaining to First Embodiment)

Figure 3:
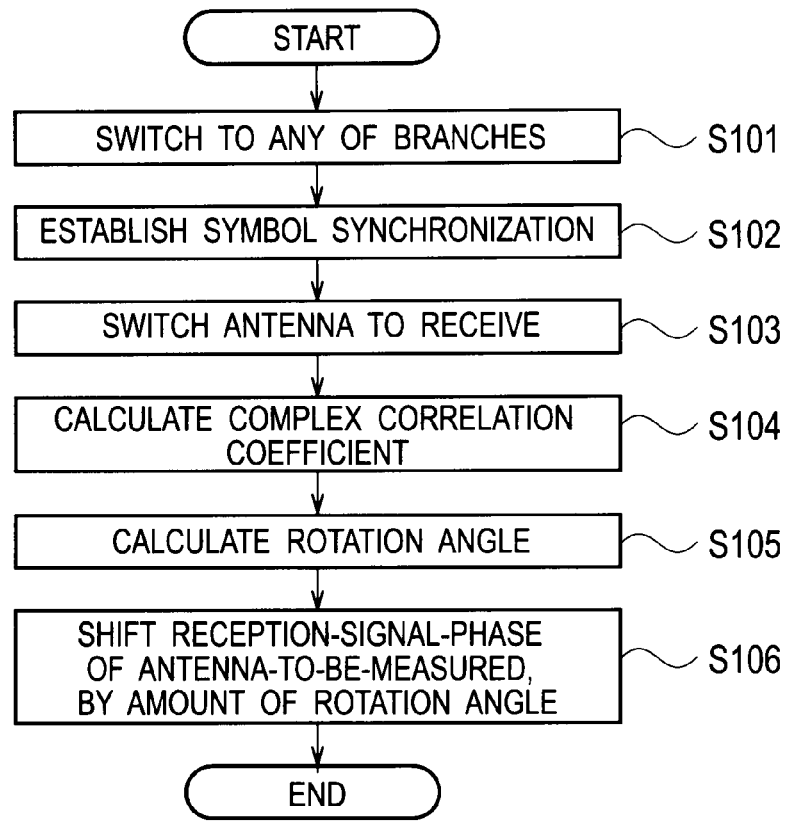
FIG. 3 is a flowchart describing an outline of a diversity reception method that uses the diversity reception device pertaining to the first embodiment.

The operational example of the diversity reception device pertaining to the first embodiment of the present invention will be described below by referring to the flowchart illustrated in FIG. 3.

(a) At first, in Step S101, the antenna switching circuit 221 in the arithmetic and control processing circuit (DSP) 22 transmits a signal DO to the switch S and selects connections to either the first antenna A1 or the second antenna A2.

(b) In Step S101, the symbol synchronization circuit 222 establishes the symbol synchronization on the basis of the sliding correlation and the like.

(c) When the symbol synchronization is established, in Step S103, the antenna switching circuit 221 transmits the signal DO to the switch S, and the switch S selects connections to either the first antenna A1 or the second antenna A2, at a timing near the center of each of the symbol periods $S_j$, $S_{j+1}$, - - -, as illustrated in FIG. 1B. Consequently, a part of the outputs of the first antenna A1 is entered through the first directional coupler 11 to the receiver 21, and a part of the outputs of the second antenna A2 is entered through the second directional coupler 12 to the receiver 21. As illustrated in FIG. 1B, in the first halves of the symbol periods $S_j$, $S_{j+1}$, signals $A1_j$, $A1_{j+1}$, - - - of the first antenna A1 are sent to the receiver 21, respectively, and in the second halves, signals $A2_j$, $A2_{j+1}$, - - - of the second antenna A2 are sent to the receiver 21, respectively. Thus, in Step S103, the receiver 21 further demodulates the signals $A1_j$, $A1_{j+1}$, - - - of the first antenna A1 and the signals $A2_j$, $A2_{j+1}$, - - - of the second antenna A2.

(d) In Step S103, after the receiver 21 demodulates the signals $A1_j$, $A1_{j+1}$, - - - of the first antenna A1 and the signals $A2_j$, $A2_{j+1}$, - - - of the second antenna A2, in Step S104, the complex correlation coefficient calculator 223 uses the Eq. (1) and calculates the complex correlation coefficient ρ between the guard interval GI of the first antenna A1 and the copy-source interval T of the second antenna A2, from which the guard interval GI is copied.

[Equation 1]

$$\rho = \frac{\sum_i x_i y_i^*}{\sqrt{\sum_i x_i x_i^*} \sqrt{\sum_i y_i y_i^*}} \quad (1)$$

In Eq. (1), $x_i$ indicates the signal of the guard interval GI received by the first antenna A1, and $y_i$ indicates the signal of the copy-source interval T received by the second antenna A2 from which the guard interval GI is copied.

(e) In Step S105, the rotation angle calculator 224 determines a rotation angle φ on the complex plane on the basis of the complex correlation coefficient ρ determined in Step S104.

$$\phi = \angle \rho \quad (2)$$

(f) In Step S106, when the phase shifting circuit 225 shift the phase of the reception signal of the second antenna A2 to the opposite direction, correspondingly to the value of the rotation angle φ, the in-phase reception is carried out.

$$y(t) = x_1(t) + x_2(t)e^{-j\phi} \quad (3)$$

In Eq. (3), $x_1(t)$ indicates the signal received by the first antenna A1, $x_2(t)$ indicates the signal received by the second antenna A2, and y(t) indicates an array output signal. As for the data obtained in each symbol period $S_j$ in FIG. 1B (the signal of the guard interval GI and the signal of the copy-source interval T), a phase compensation amount is calculated in the next symbol period $S_{j+1}$, and the phase shifter is controlled at the head of the further next symbol period $S_{j+2}$, and a phase compensation is carried out. That is, in such a way that respective timings $\phi_{j-2}$, $\phi_{j-1}$, $\phi_j$, - - - when the phase compensations are carried out are indicated at the heads of the respective guard intervals GI in FIG. 1B by using upward arrows, in the diversity reception device pertaining to the first embodiment, the phase of the reception signal of the second antenna A2 is sequentially compensated after the delay corresponding to one symbol period, after the data obtainment.

According to the diversity reception method pertaining to the first embodiment, the channel phase difference is directly determined for each of the symbol periods $S_j$, $S_{j+1}$, - - -. Thus, the search is not required. Also, according to the diversity reception method pertaining to the first embodiment, when the synchronization is established, one complex correlation coefficient ρ is only calculated. Hence, the calculation amount is small, which enables the response to the fast fading. Also, in the diversity reception method pertaining to the first embodiment, the existing digital terrestrial broadcast tuner can be used without any change.

(Reception Output Under Rayleigh Fading)

TABLE 1

| Fading | | Rayleigh |
|---|---|---|
| | Doppler frequency | 25 Hz |
| symbol | mode | 1 |
| | guard interval | ⅛ |
| | modulation | 64QAM |
| | error correction | none |
| antena | element number | 2 |
| | element spacing | λ/2 |
| Channel Estimation | | scattered pilot |

Figure 4:
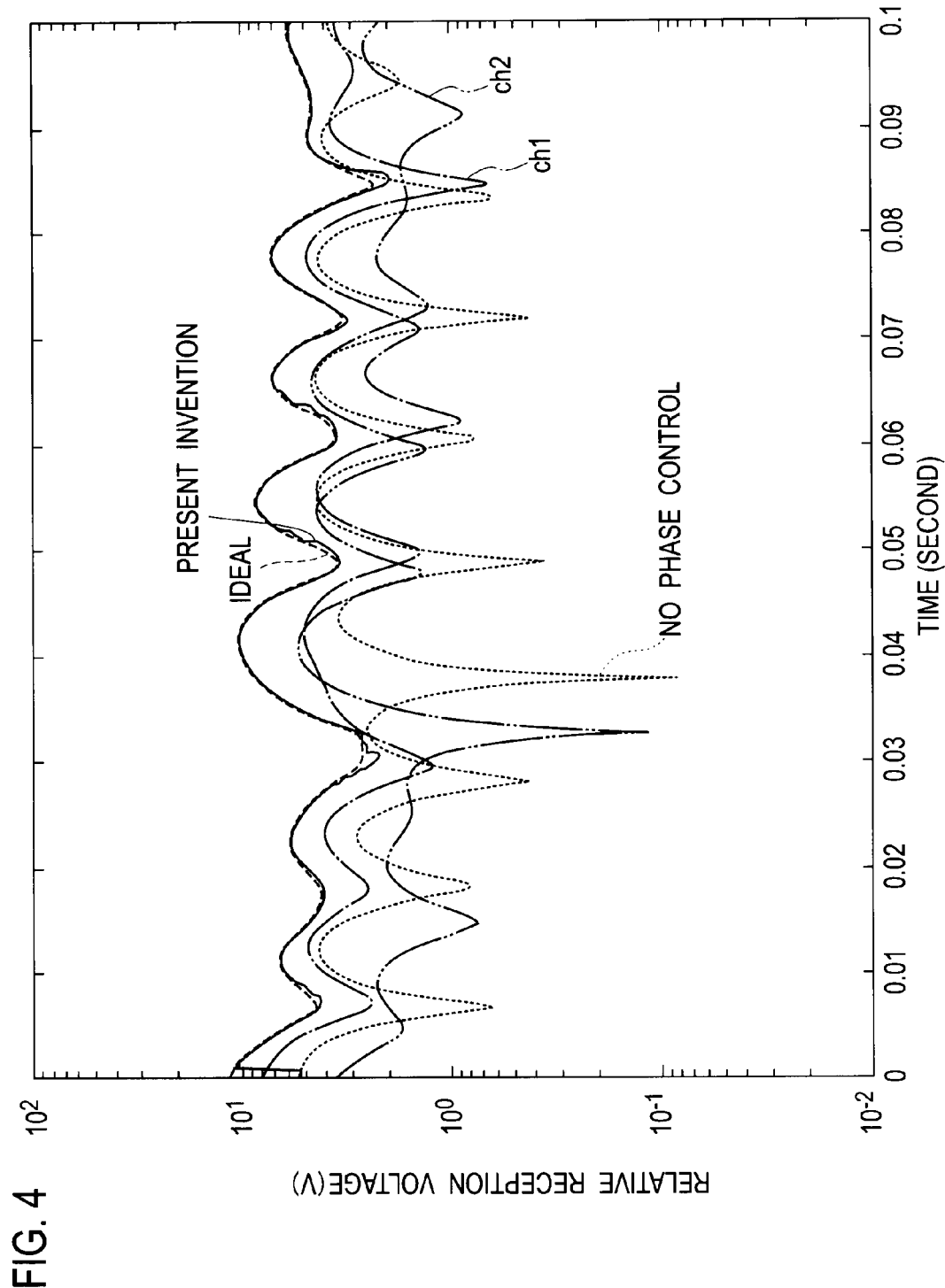
FIG. 4 is a view, which illustrates a change in a received-channel voltage (reception envelope) under Rayleigh fading in the diversity reception device pertaining to the first embodiment, in comparison with the reception envelopes of a first branch, a second branch, a case when the phase control is not carried out, and an ideal phase diversity.

Under the conditions illustrated on Table 1, results of simulation of the changes in the received-channel voltages of the double-branch diversity, under Rayleigh fading, are illustrated in FIG. 4. As illustrated on Table 1, guard interval GI is ⅛ of the symbol period, 64QAM is used for modulation, and Doppler frequency is set to 25 Hz. Also, error corrections are not carried out in order to simplify the calculation. The ordinate of FIG. 4 indicates relative reception voltages, and the abscissa indicates time (second). Also, in FIG. 4, the dash-and-one-doted line indicates a reception envelope of the first branch, the dash-and-two-doted line indicates a reception envelope of the second branch, the dotted line indicates a reception envelope when the phase control is not carried out, and the dashed line indicates a reception envelope of the ideal phase diversity (based on a channel estimation of each branch), and the solid line indicates a reception envelope of the diversity reception device pertaining to the first embodiment. From FIG. 4, in the Rayleigh fading environment, it is clear that the reception envelope of the diversity reception device pertaining to the first embodiment is substantially equal to the reception envelope of the ideal phase shift diversity.

(Influence of Phase Compensation Delay)

Figure 5:
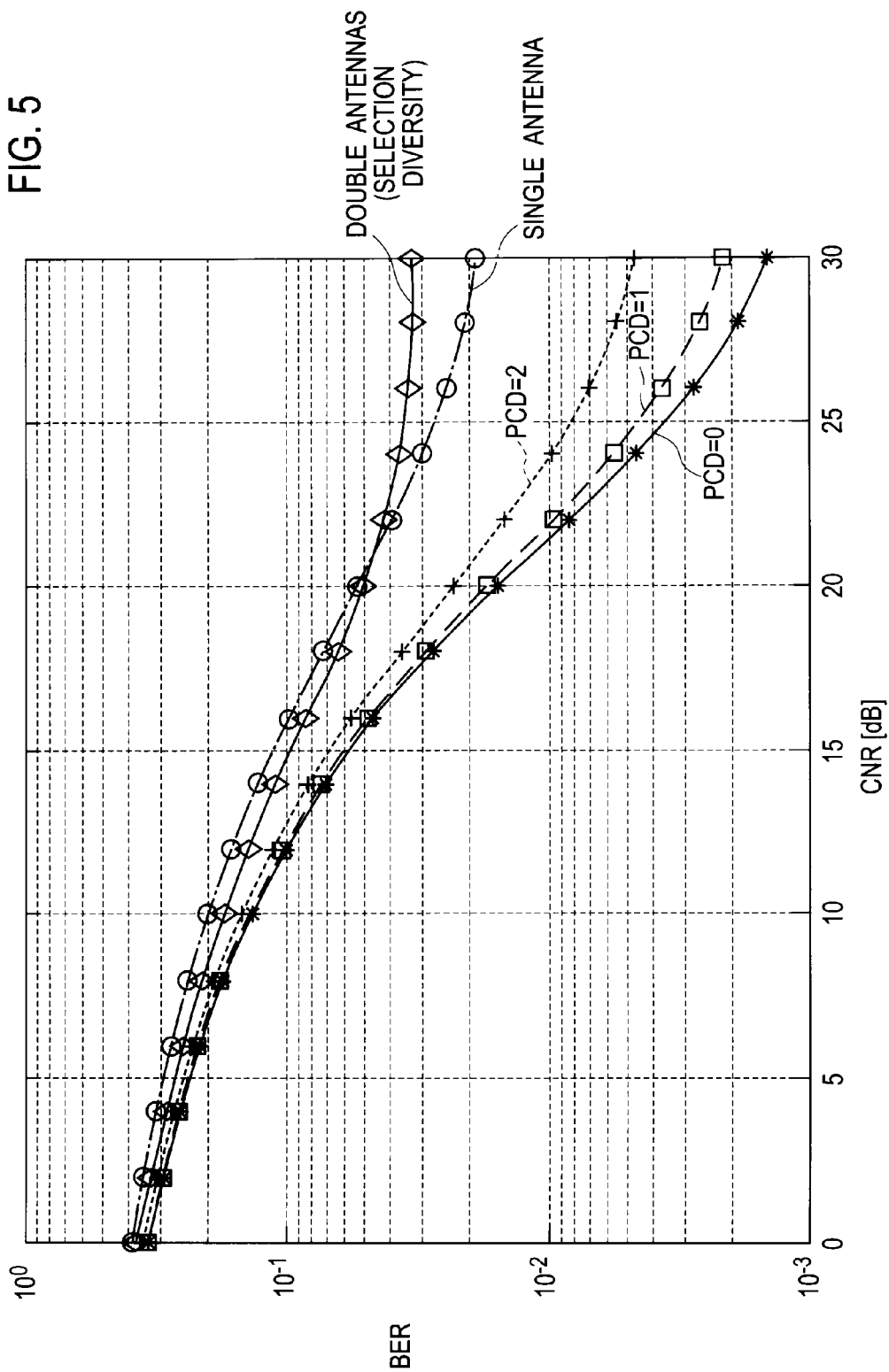
FIG. 5 is a view illustrating BER-CNR characteristics that describes an influence of a phase compensation delay, in the diversity reception device pertaining to the first embodiment.

In the diversity reception device pertaining to the first embodiment of the present invention, even in the case of the double-branch diversity, the response of the phase compensation is delayed by amount of at least one symbol. FIG. 5 illustrates results when the influences of the delay are confirmed by computer-simulation. Although the conditions of the simulation illustrated in FIG. 5 are similar to the conditions illustrated on Table 1, by considering the actual service, the symbol of the transmission parameter is assigned as mode III used in actual broadcast system (prefecture-level area, fixed usage).

FIG. 5 illustrates BER-CNR characteristics of the diversity reception device pertaining to the first embodiment, when the phase compensation delay (PCD) is zero (no delay), one symbol and two symbols. In FIG. 5, other BER-CNR characteristics are also calculated and illustrated for comparison, in a case when a single antenna is used to receive, and a case when double antennas are used to carry out the selection diversity. From FIG. 5, we understand that the BER-CNR characteristics degrade as the phase compensation delay increases such as one symbol (PCD=1)→f two symbols (PCD=2). The degrade of the BER-CNR characteristics is ascribable to the generation of the delay, which disables the response of the phase to sufficiently follow the channel fluctuation, which is caused by the fading.

However, even if the phase compensation is delayed by two symbols, the BER improves according to the diversity reception method pertaining to the first embodiment. In particular, when the value of BER is near $10^{-2}$, the improvement of about 10 dB can be estimated.

(Band Limit and Sampling Speed)

One feature of the architecture of the diversity reception device pertaining to the first embodiment of the present invention lies in the technical advantage that even current television receivers of existing technology can facilitate receptions, without any change. FIGS. 6 to 9 illustrate the technical advantages that, even if the reception band of 5 MHz is limited to 2 MHz and the sampling speed of the AD-converter is set to 500 ksps in order to achieve lower cost, the correlation coefficient can be calculated without any error, which are confirmed by the computer-simulation. In the evaluations of the computer-simulations illustrated in FIGS. 6 to 9, the switching between the branches is not carried out and the fading is not added.

Figure 6:
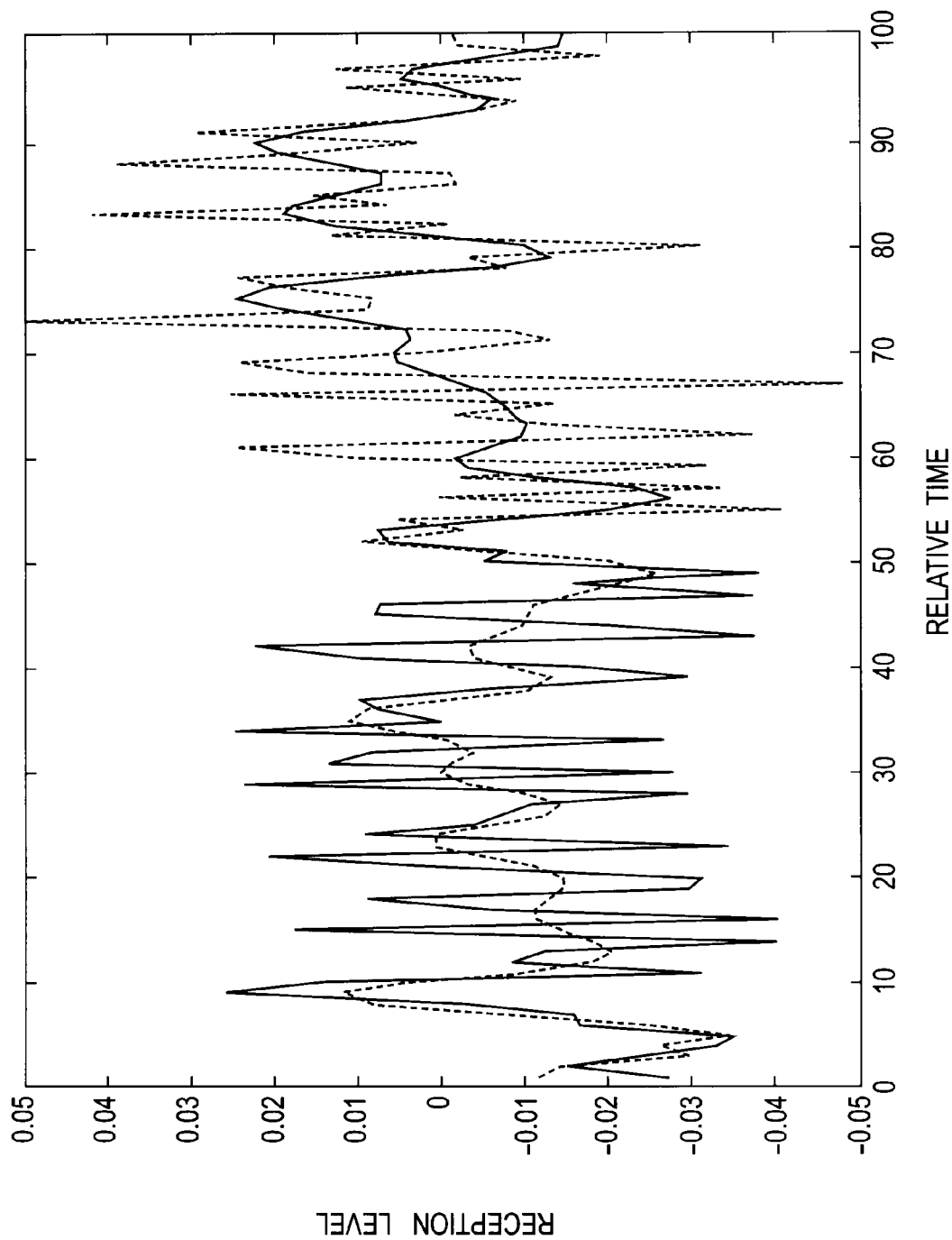
FIG. 6 is a view illustrating demodulated 64QAM signals of 1-channel of mode III, in a situation in which noise is not added to the diversity reception device pertaining to the first embodiment in which a reception band is limited to 2 MHz, and a sampling speed of an AD converter is set to 500 ksps.
Figure 7:
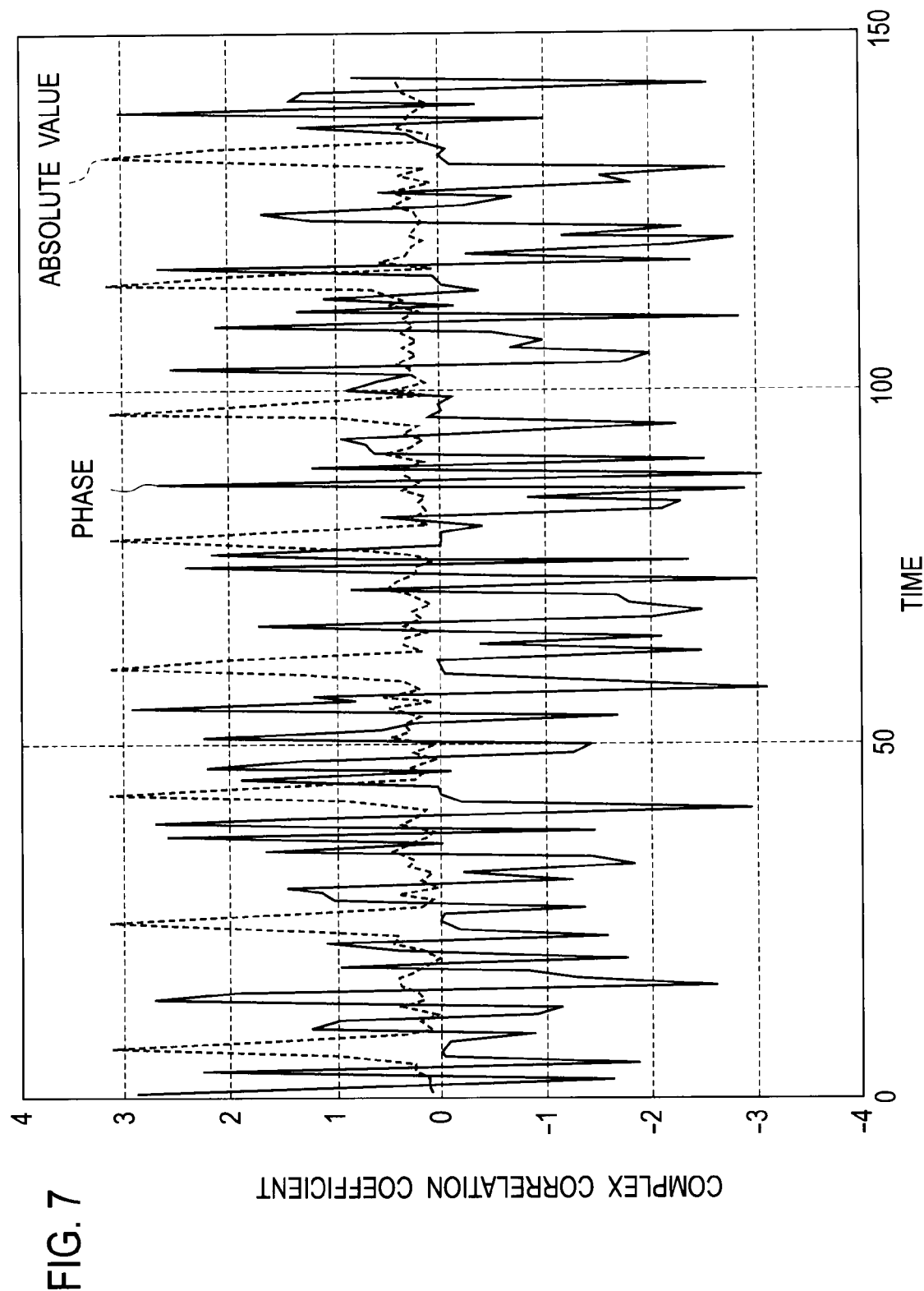
FIG. 7 is a view, which illustrates an amplitude and a phase of the complex correlation coefficient, in a situation in which the noise is not added to the diversity reception device pertaining to the first embodiment, when the reception band is limited to 2 MHz and then sampling is carried out at 500 ksps (in order to easily view, absolute value of complex correlation coefficient is multiplied by $\pi$).
Figure 8:
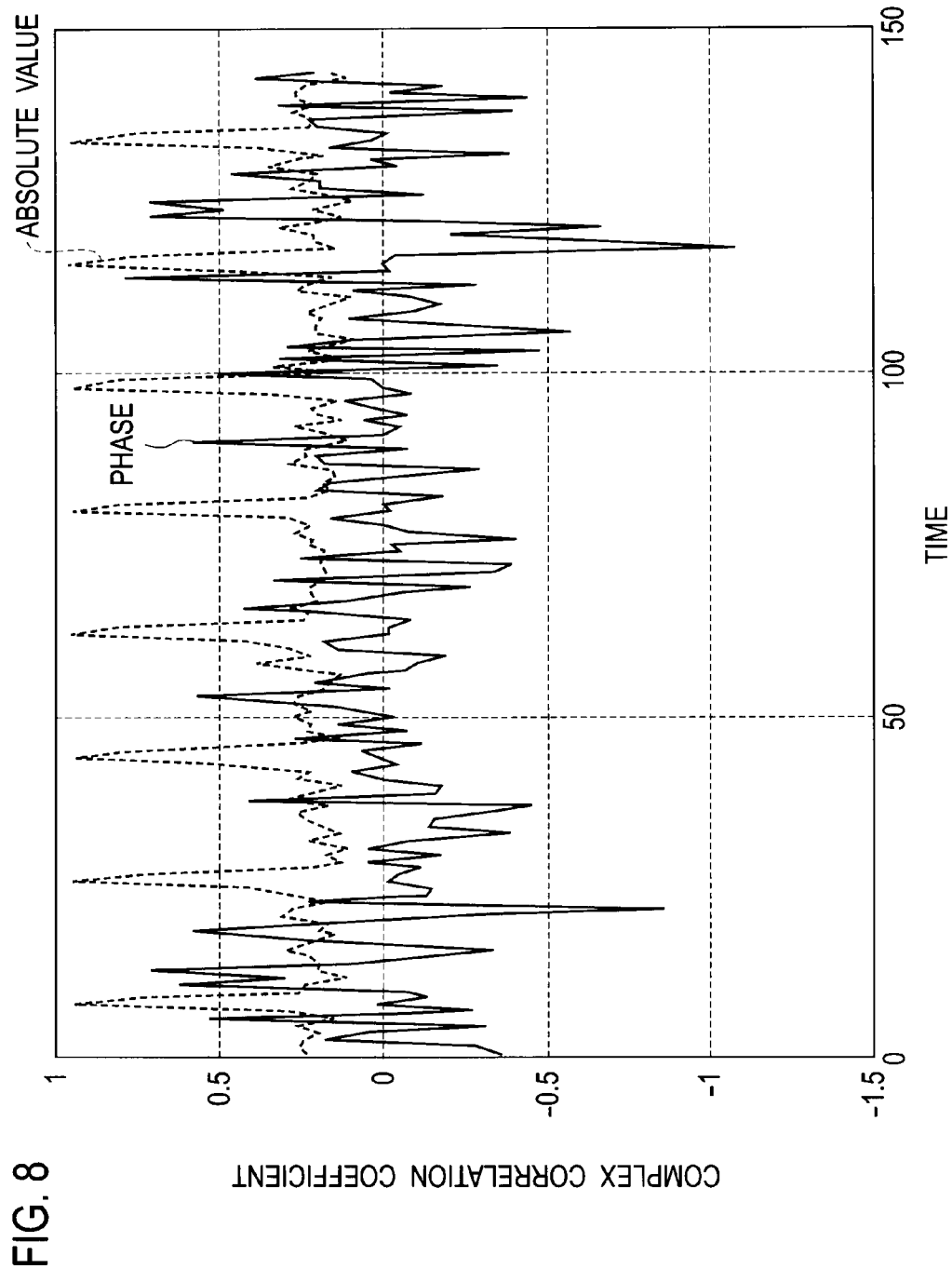
FIG. 8 is a view, which illustrates the amplitude and the phase of the complex correlation coefficient, in a situation in which the noise is added to the diversity reception device pertaining to the first embodiment, when the reception band is limited to 2 MHz and then the sampling is carried out at 500 ksps (in order to easily view, absolute value of complex correlation coefficient is not multiplied by $\pi$).
Figure 9:
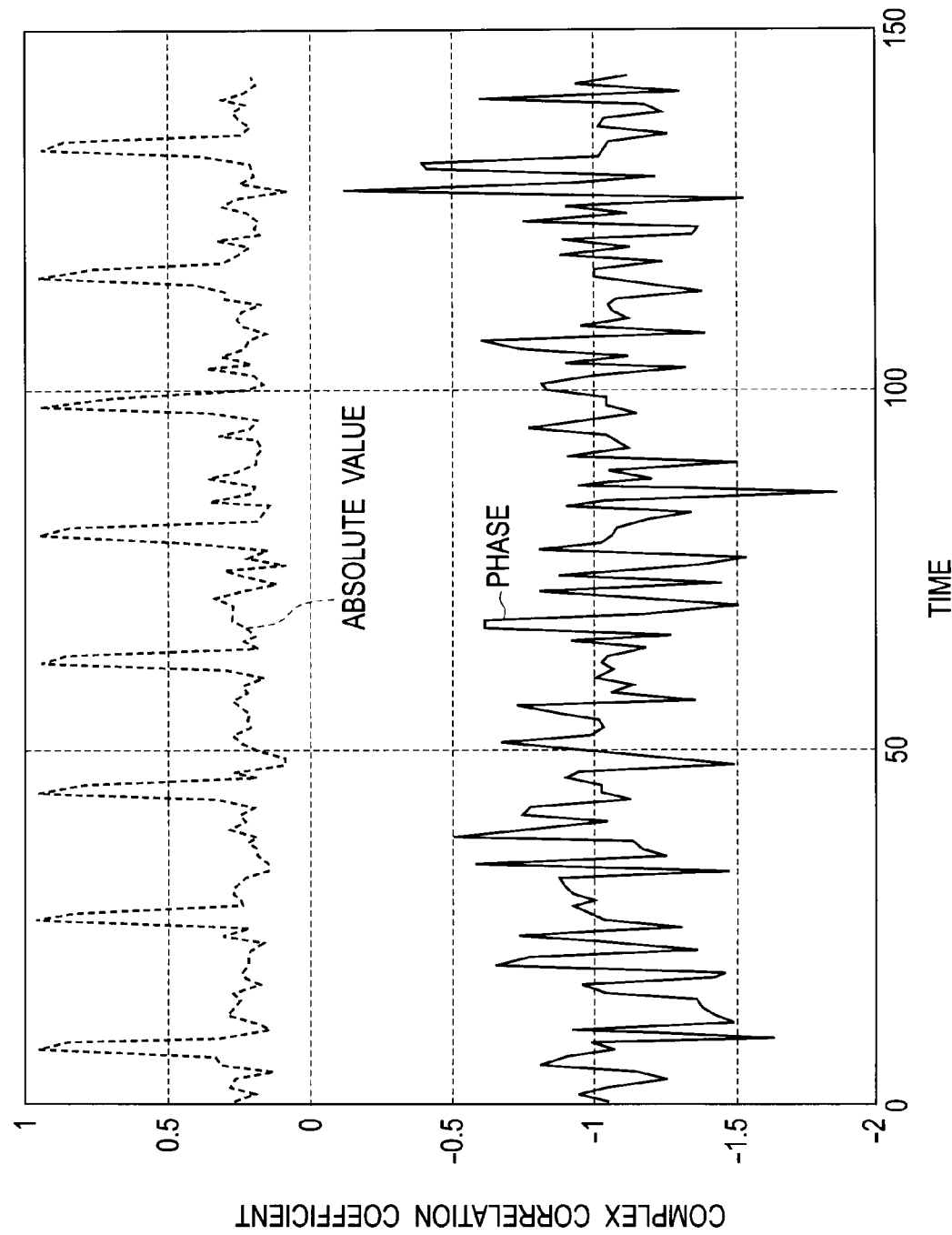
FIG. 9 is a view, which illustrates the amplitude and the phase of the complex correlation coefficient, in a situation in which the noise is added to the diversity reception device pertaining to the first embodiment, when the reception band is limited to 2 MHz, the sampling is carried out at 500 ksps, and further a phase in the duration of copy-source interval T is advanced by $\pi/3$ and then the amplitude is multiplied by 0.3 (absolute value of complex correlation coefficient is not multiplied by $\pi$).

FIG. 6 illustrates I-channel of 64QAM signal in mode III. Here, the noise is not added. The ordinate indicates reception levels, and the abscissa indicates relative time. It is clear that the reception signal is smooth as the band is limited to 2 MHz. FIG. 7 illustrates absolute value of the amplitude of complex correlation coefficient by dashed line and the phase by solid line that, for a case when signals, whose band is limited, are sampled at 500 ksps. In order to be easily understood, in FIG. 7, the absolute value of complex correlation coefficient is multiplied by $\pi$. The phase at a timing when the absolute value of complex correlation coefficient becomes maximum is zero, owing to the identical channel reception. Even if the band is limited and the sampling is carried out at the Nyquist frequency or less, it is clear that the calculation of the complex correlation coefficient is not significantly affected. In FIG. 8, for a case when noise ($E_b/N_o$=10 dB) is added, absolute value of the amplitude of complex correlation coefficient is indicated by dashed line, and the phase is indicated by solid line. When the noise is added, the floor value of absolute value of complex correlation coefficient is increased, and the phase change becomes small. FIG. 9 illustrates the complex correlation coefficient when the phase in the duration of the copy-source interval T is advanced by $\pi/3$ and the amplitude is set to 0.3. Here, absolute value of complex correlation coefficient is not multiplied by $\pi$. It is indicated that in the guard interval GI, there is $\pi/3$ phase delay as compared with the copy-source interval T.

(Carrier Synchronization)

Figure 10:
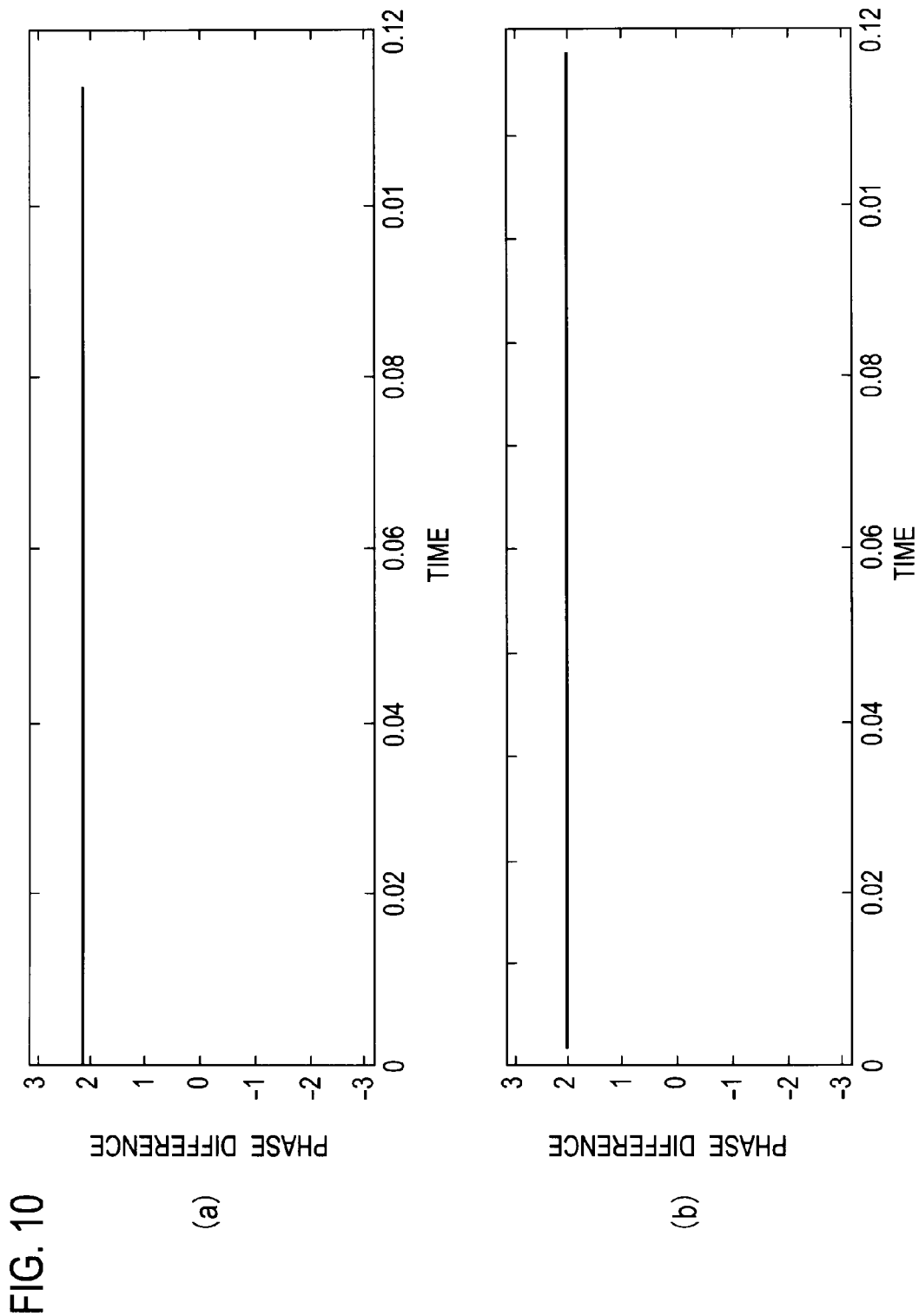
FIG. 10 is a view illustrating a temporal variation in a phase difference between branches, when a Doppler frequency is set to 0 Hz, in the diversity reception device pertaining to the first embodiment.
Figure 11:
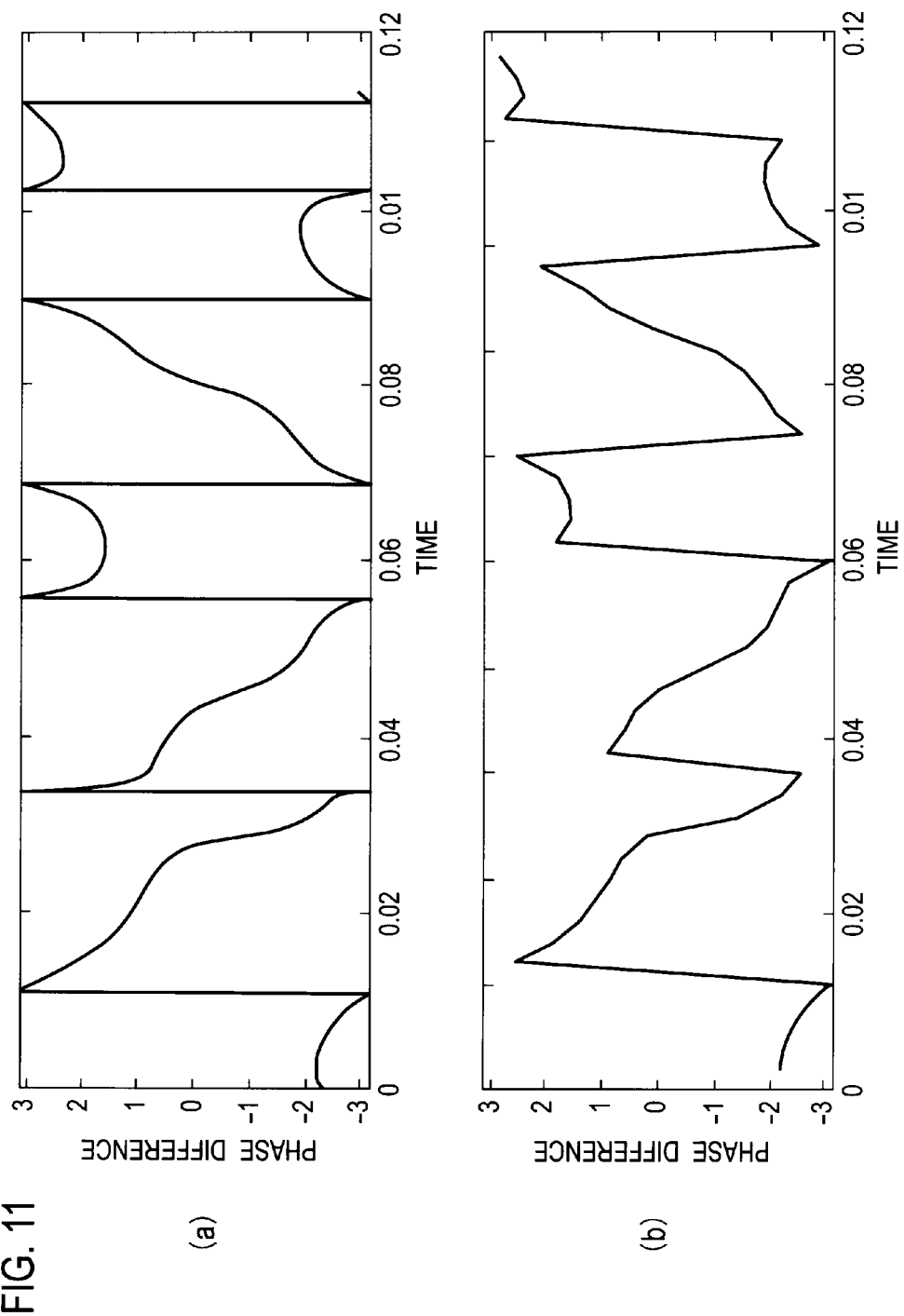
FIG. 11 is a view illustrating temporal variation in the phase difference between the branches, when Doppler frequency is set to 25 Hz, in the diversity reception device pertaining to the first embodiment.

Whether or not a perfect carrier synchronization is required for the diversity reception device pertaining to the first embodiment of the present invention is confirmed by computer-simulation, and the results are illustrated in FIGS. 10 and 11. FIG. 10 illustrates temporal variations of the phase differences between the branches when Doppler frequency $F_D$ is set to 0 Hz. FIG. 11 illustrates temporal variations of the phase differences between the branches when Doppler frequency $F_D$ is set to 25 Hz. FIGS. 10 (a) and 11 (a) illustrate the true phase differences, and FIGS. 10 (b) and 11 (b) illustrate phase differences estimated in the system, and signals are demodulated by a local oscillator, the frequency of which differs from the carrier frequency by 1 kHz. As illustrated in FIG. 11, at Doppler frequency $f_D$=25 Hz, it is clear that the phase difference is provided after one symbol delay. Upper and lower phase curves substantially coincide with each other. Thus, in the diversity reception device pertaining to the first embodiment, the phase difference can be determined without any establishment of the perfect carrier synchronization.

(Influence of Delay Wave)

The advantageous feature of the ISDB-T approach lies in the effectiveness that even with the existence of the delay wave in the guard interval GI, the delay wave has no influence on reception quality. However, in the diversity reception device pertaining to the first embodiment of the present invention, since the reception envelopes of the respective branches are used to determine the phase difference, it is considered that the phase calculation will be affected. At each of the branches, a random delay in the guard interval GI was generated, and the delay wave in which a logarithmic ratio (DU ratio) of electric field intensity between a target wave (direct wave) and an interference wave was 5 dB was generated. The inventors of the present invention, and others are measuring the delay profiles of fields about 50 locations or more in Tokyo, Kanagawa Prefecture and Hamamatsu City. However, the delay wave exceeding the guard interval GI is not recognized at present. Also, the delay wave in the guard interval GI is occasionally found here and there. However, even at a worst case, the DU ratio is found to be about 7 dB. Therefore, the above condition may be considered to be the worst case.

Figure 12:
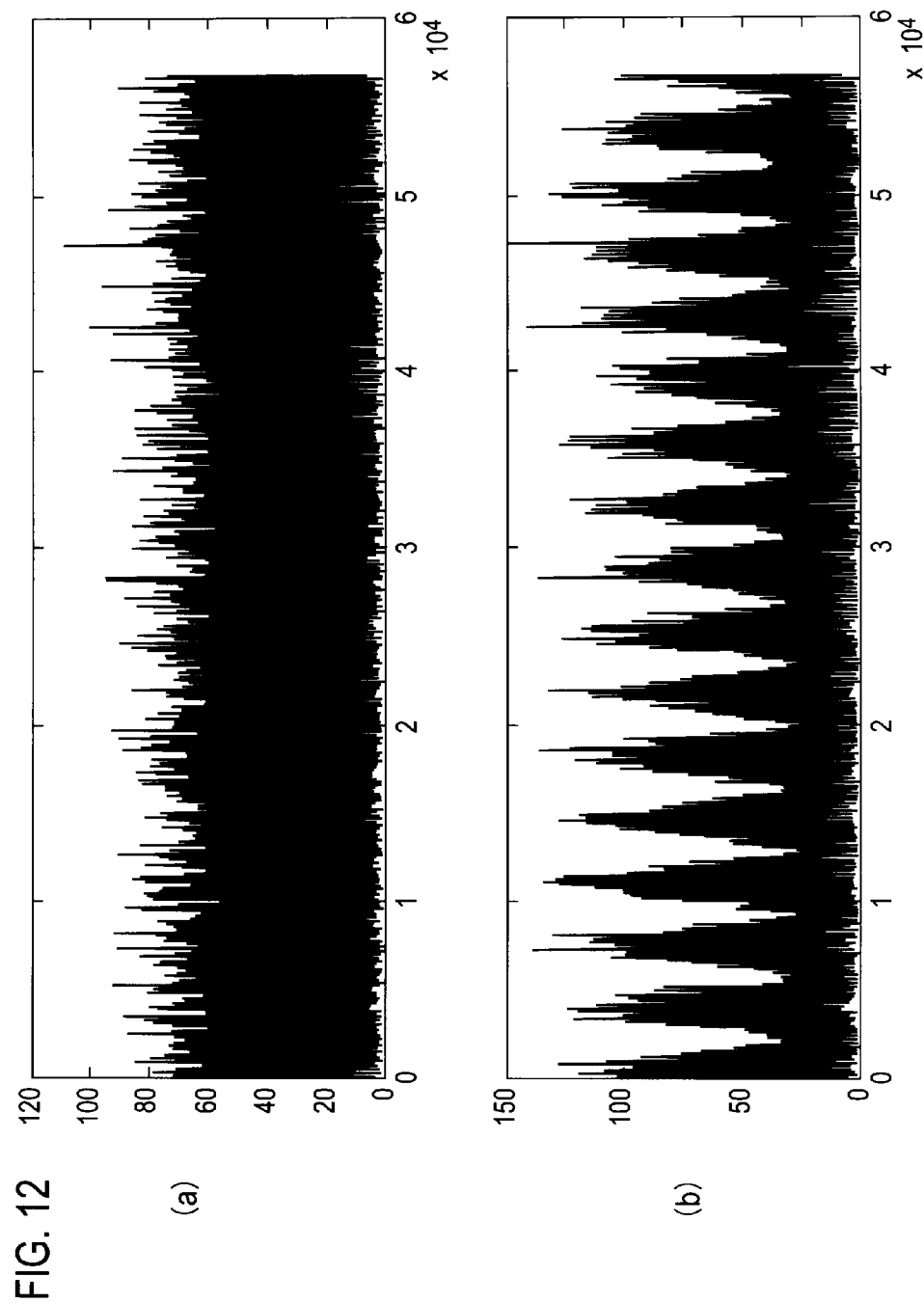
FIG. 12 is a view illustrating demodulated signals of 1-channel of 64QAM when Doppler frequency is 0 Hz, in the diversity reception device pertaining to the first embodiment, and FIG. 12 (a) is a view when there is not a delay wave, and FIG. 12 (b) is a view when there is the delay wave.
Figure 13:
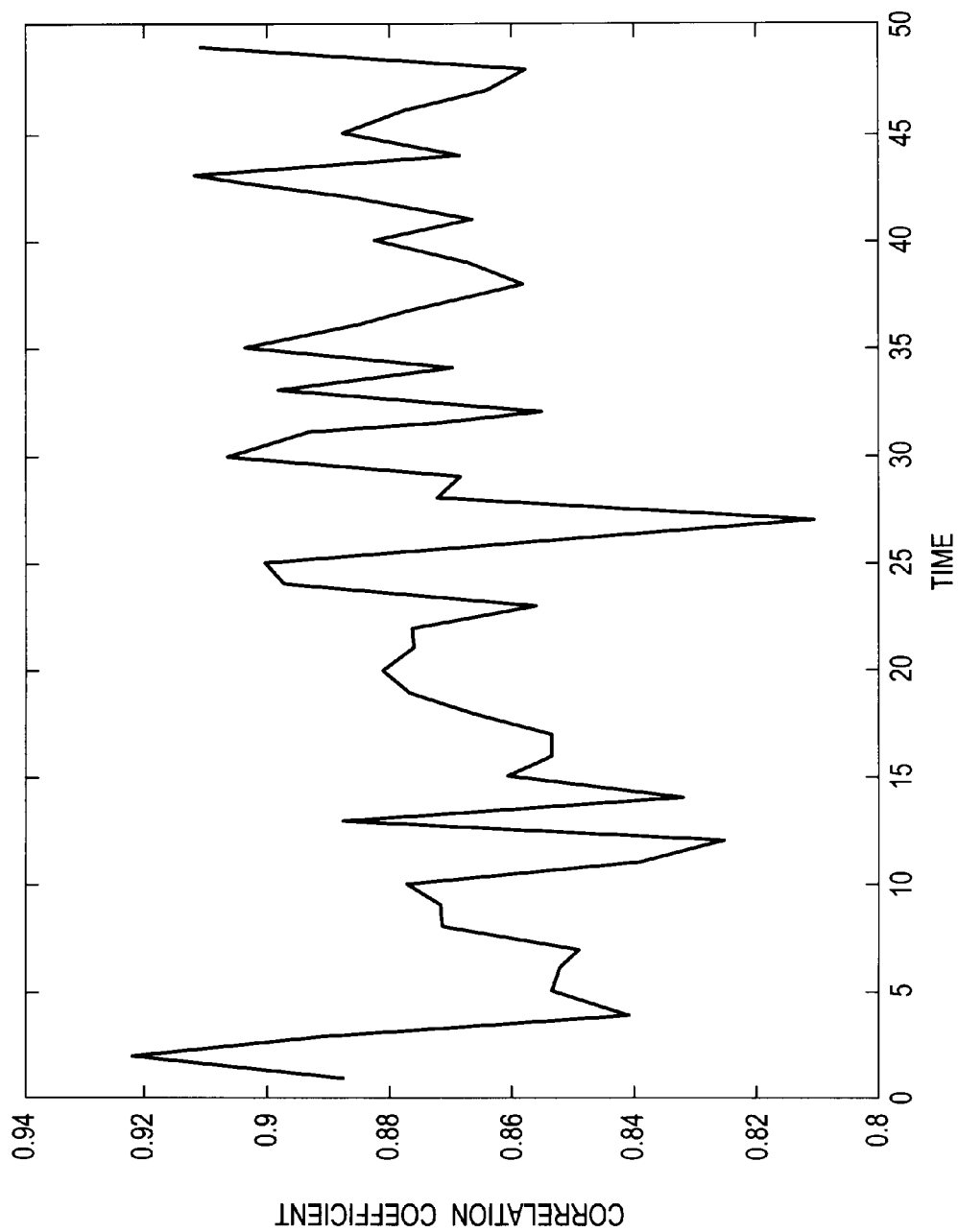
FIG. 13 is a view illustrating a temporal variation in absolute value of a correlation coefficient when there is the delay wave, in the diversity reception device pertaining to the first embodiment.

FIG. 12 illustrates the demodulated signal of 1-channel (in-phase component) of 64QAM when Doppler frequency $f_D$ is 0 Hz, and FIG. 12 (a) illustrates a case when there is no delay wave, and FIG. 12 (b) illustrates a case when there is a delay wave. As illustrated in FIG. 12 (b), when the delay wave is added, it is clear that the demodulated signal of 64QAM is greatly changed. FIG. 13 illustrates temporal variation in absolute value of correlation coefficient when there is the delay wave. When there is the delay wave, the absolute value of correlation coefficient proves to be decreased.

Figure 14:
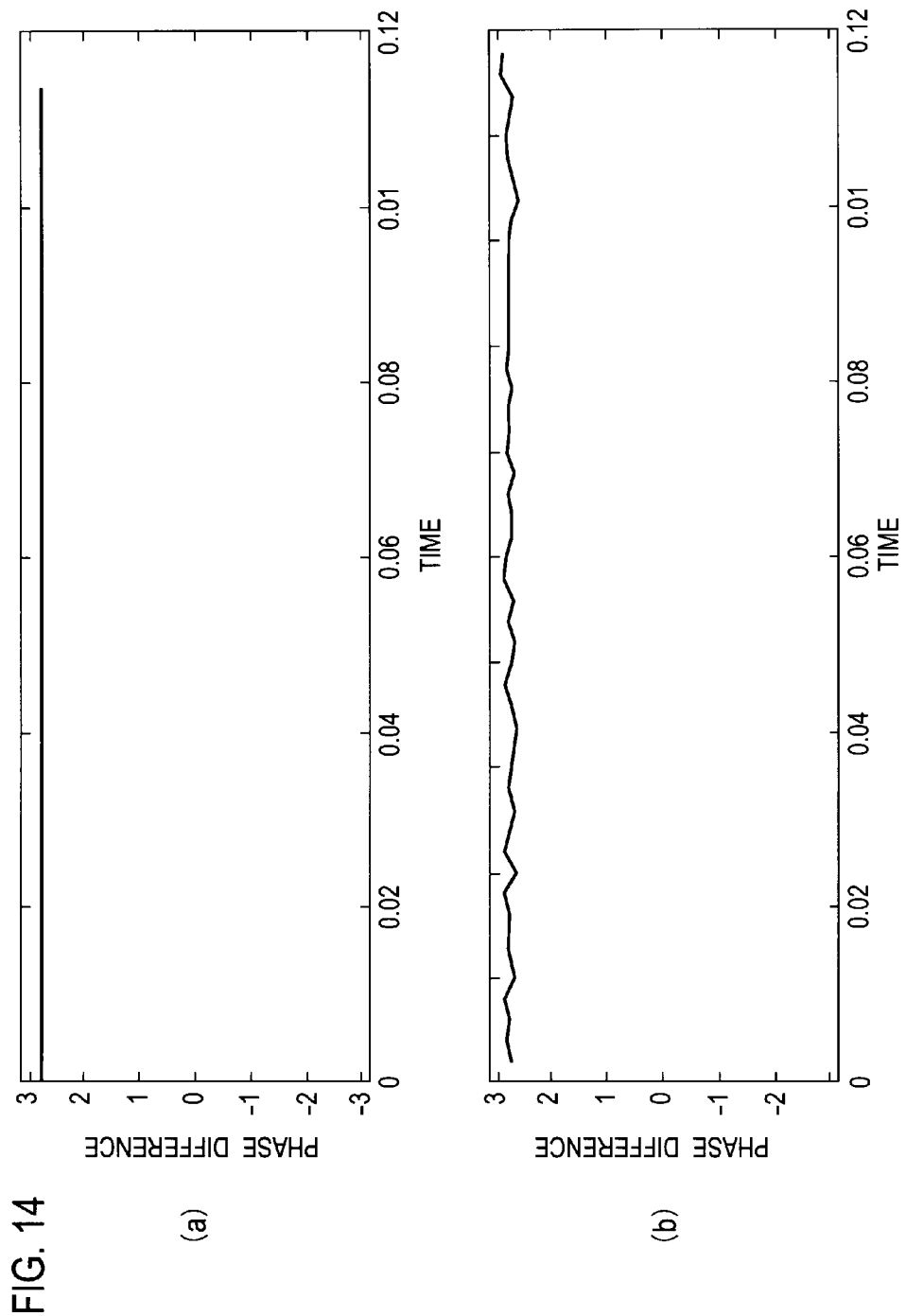
FIG. 14 is a view illustrating temporal variation in the phase difference between the branches when Doppler frequency is 0 Hz, in the diversity reception device pertaining to the first embodiment.
Figure 15:
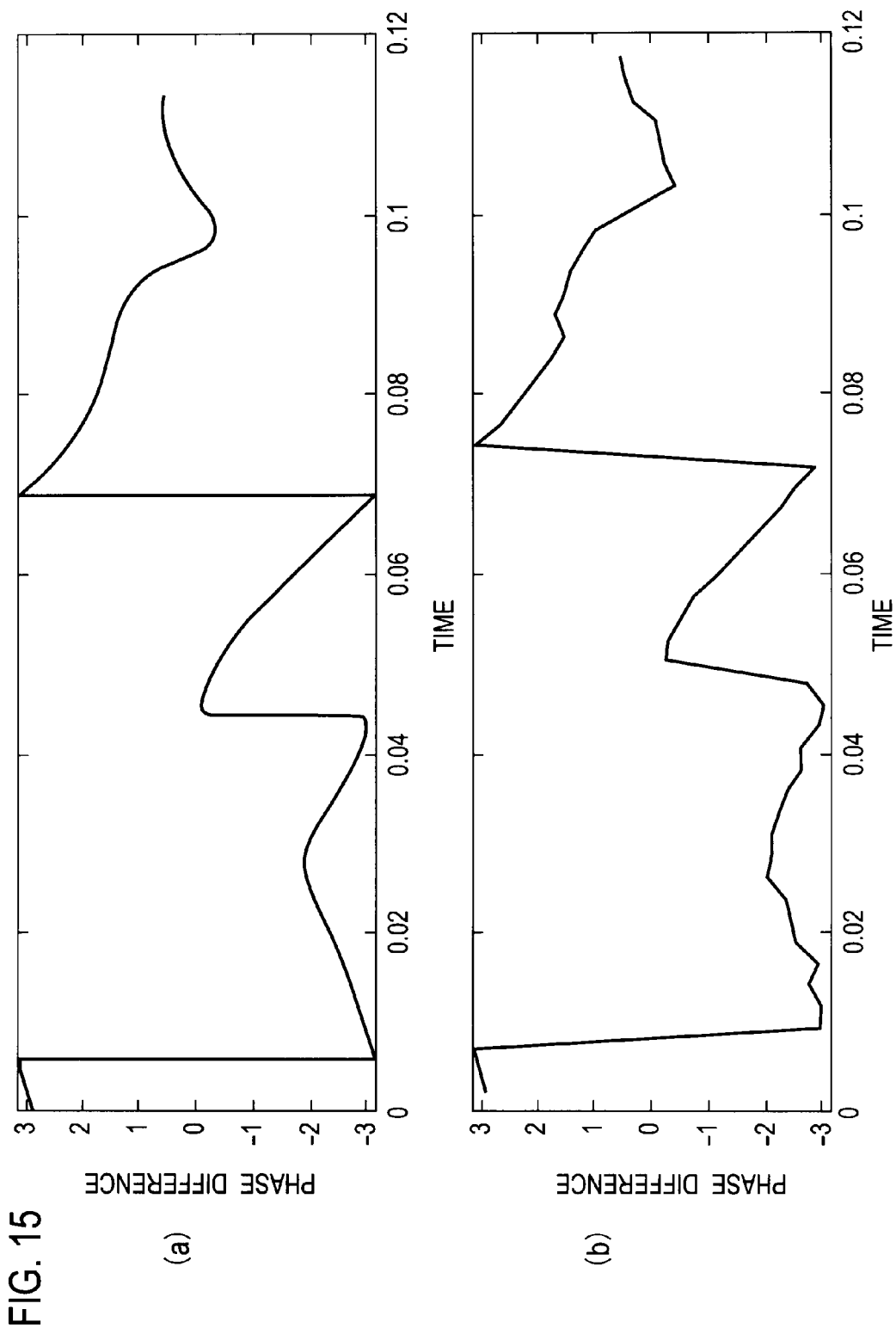
FIG. 15 is a view illustrating temporal variation in the phase difference between the branches when Doppler frequency is 25 Hz, in the diversity reception device pertaining to the first embodiment.

FIG. 14 illustrates time difference in phase difference between the branches when Doppler frequency $f_D$ is 0 Hz, and FIG. 15 illustrates the time difference in the phase difference between the branches when Doppler frequency $f_D$ is 25 Hz. FIGS. 14 (a) and 15 (a) illustrate the true phase differences, and FIGS. 14 (b) and 15 (b) illustrate the phase differences estimated by the diversity reception device pertaining to the first embodiment, when the delay waves are superimposed. As for the phase, because any great influence is not recognized even in the presence of delay wave in which the DU ratio is 5 dB, by the diversity reception device pertaining to the first embodiment, a robust operation in the field can be achieved.

As mentioned above, according to the diversity reception device pertaining to the first embodiment, because the configuration implemented by a single reception channel is available, diversity reception devices with low-cost and low-power consumption can be provided. Moreover, according to the diversity reception device pertaining to the first embodiment, because a repetitive operation is not required, usages of the diversity reception devices in fast fading environment can be facilitated. Moreover, according to the diversity reception device pertaining to the first embodiment, because the carrier synchronization is not required, operations of the diversity reception devices even at a sampling frequency lower than the Nyquist frequency can be achieved, and also, the diversity reception devices can achieve operations in the environment with delay waves.

(Outline of Diversity Reception Device Pertaining to Second Embodiment)

In the above description of the first embodiment, the double-branch diversity reception device is exemplified in order to simplify the description. However, the present invention can be applied to even a triple-branch diversity reception device.

Figure 16:
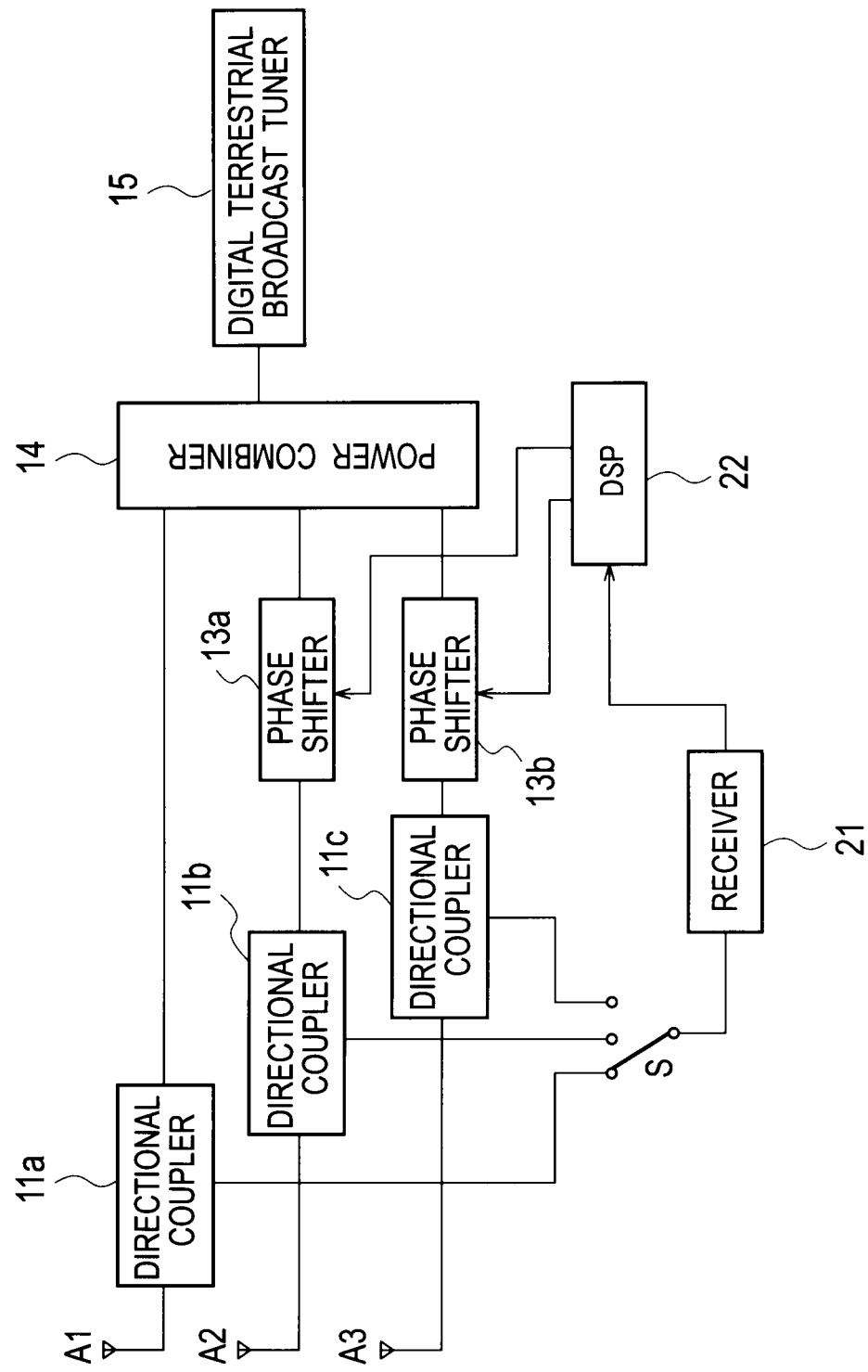
FIG. 16 is a schematic block-diagram describing an outline of a triple-branch diversity reception device pertaining to a second embodiment of the present invention.

As illustrated in FIG. 16, a triple-branch diversity reception device pertaining to a second embodiment of the present invention encompasses: a first antenna A1 serving as the reference antenna; a second antenna A2 serving as a first antenna-to-be-measured; a third antenna A3 serving as a second antenna-to-be-measured; a power combiner 14 for combining electric powers of the OFDM signals respectively received by the first antenna A1, the second antenna A2 and the third antenna A3; a digital terrestrial broadcast tuner 15 connected to the output side of the power combiner 14; a switch S for sequentially switching between the branched output-port of the first antenna A1, the branched output-port of the second antenna A2 and the branched output-port of the third antenna A3 for each of the symbol periods, in midstream of the effective symbol period of the OFDM signal; a receiver 21 that is connected to an output side of the switch S and demodulates the OFDM signal; a first phase shifter 13a that is connected to an output side of the second antenna A2 and shifts the phase of the OFDM signal received by the second antenna A2 and then transfers to the power combiner 14; a second phase shifter 13b that is connected to an output side of the third antenna A3 and shifts the phase of the OFDM signal received by the third antenna A3 and then transfers to the power combiner 14; and an arithmetic and control processing circuit 22 that accepts the demodulated signals from the receiver 21 and transfers signals for shifting the phases, the signals shift the phases by amount of rotation angles, to the first phase shifter 13a and the second phase shifter 13b, respectively. A first directional coupler 11a is connected to the output side of the first antenna A1, and a part of the outputs of the first antenna A1 is branched to the switch S side. A second directional coupler 11b is connected to the output side of the second antenna A2, and a part of the outputs of the second antenna A2 is branched to the switch S side. A third directional coupler 11c is connected to the output side of the third antenna A3, and a part of the outputs of the third antenna A3 is branched to the switch S side. To the power combiner 14, the part of the outputs of the first antenna A1 is entered through the first directional coupler 11, the part of the outputs of the second antenna A2 is entered through the second directional coupler 11b and the first phase shifter 13a, and the part of the outputs of the third antenna A3 is entered through the third directional coupler 11c and the second phase shifter 13b. In the triple-branch diversity reception device pertaining to the second embodiment, the number of the receiver 12 is one, and the receiver 12 is connected through the switch S to the first antenna A1, the second antenna A2 and the third antenna A3, in time-sharing scheme.

As the arithmetic and control processing circuit 22, it is possible to use the microprocessor such as DSP or the like. Then, signals of the receiver 21 are AD-converted and entered to the arithmetic and control processing circuit 22, and the output signals of the arithmetic and control processing circuit 22 are DA-converted and entered to the first phase shifter 13a and the second phase shifter 13b, respectively. As the first antenna A1, the second antenna A2 and the third antenna A3, it is possible to use known various antennas, such as monopole antennas, helical antennas, planer antennas (patch antennas and the like) and the like.

For the digital terrestrial broadcast tuner 15, the known circuit configuration can be used, as described in the diversity reception device pertaining to the first embodiment. Thus, its detailed description is omitted.

Figure 17:
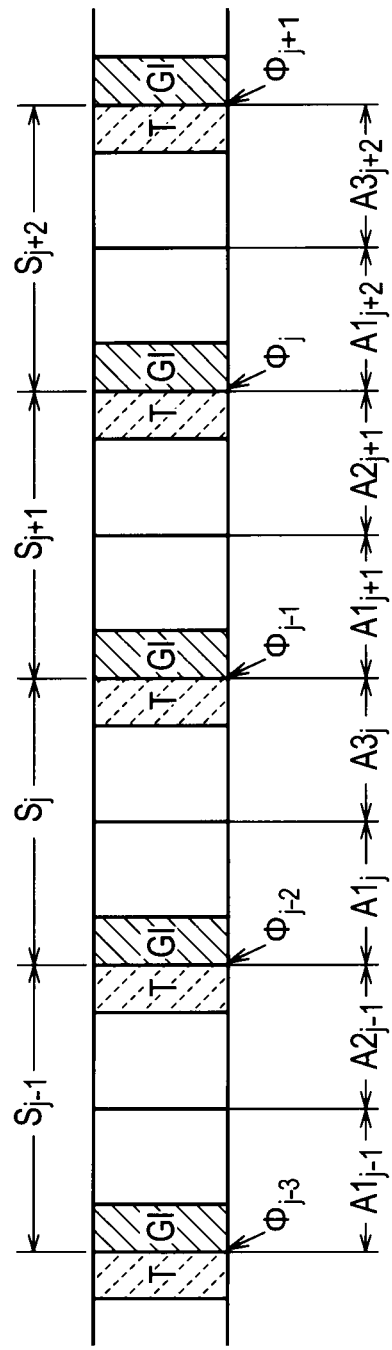
FIG. 17 is a time chart describing a behavior of the triple-branch diversity reception device pertaining to the second embodiment, which changes connections between the first antenna and the second antenna in one symbol period, and changes connections between the first antenna and a third antenna in a next symbol period, and sequentially calculates the complex correlation coefficient between the guard interval of the first antenna and the copy-source interval of the second antenna and the complex correlation coefficient between the guard interval of the first antenna and the copy-source interval of the third antenna.

As illustrated in FIG. 17, OFDM signals in which the guard intervals GI are provided in the respective symbol periods $S_{j-1}$, $S_j$, $S_{j+1}$, $S_{j+2}$, - - - of the inverse-discrete-Fourier-transformed signals are entered to the first antenna A1, the second antenna A2 and the third antenna A3. The period in which the interval length of the guard interval GI is subtracted from the interval length of each of the symbol periods $S_{j-1}$, $S_j$, $S_{j+1}$, $S_{j+2}$, - - - becomes the effective symbol period (observation window period). Each of the guard intervals GI is just copied cyclically without any change, in which the waveform of the copy-source interval T in the second half of the effective symbol period in each of the symbol periods $S_{j-1}$, $S_j$, $S_{j+1}$, $S_{j+2}$, is defined as the dummy signal. Then, in the symbol period $S_{j-1}$, the switching between the first antenna A1 and the second antenna A2 is carried out, and a complex correlation coefficient $\rho_2$ between the guard interval GI of the first antenna A1 and the copy-source interval T of the second antenna A2 is calculated. In the next symbol period $S_j$, the switching between the first antenna A1 and the third antenna A3 is carried out, and a complex correlation coefficient $\rho_3$ between the guard interval GI of the first antenna A1 and the copy-source interval T of the third antenna A3 is calculated. In the next symbol period $S_{j+1}$, the switching between the first antenna A1 and the second antenna A2 is carried out, and the complex correlation coefficient $\rho_2$ between the guard interval GI of the first antenna A1 and the copy-source interval T of the second antenna A2 is calculated. In the next symbol period $S_{j+2}$, the switching between the first antenna A1 and the third antenna A3 is carried out, and the complex correlation coefficient $\rho_3$ between the guard interval GI of the first antenna A1 and the copy-source interval T of the third antenna A3 is calculated. Then, on the basis of the complex correlation coefficients, the rotation angles on complex plane are sequentially determined to compensate the phases of the reception signals of each of the second antenna A2 and the third antenna A3. As for the timings when the phase compensations are carried out, the phase compensation amounts are calculated in the symbol period next to the symbol period in which the data is obtained, and the phase shifters are controlled at the head of the next symbol period, and the phase compensations are carried out. That is, after each process of the data obtainments, the triple-branch diversity reception device compensate sequentially the phases of the reception signals from the second antenna A2 and the third antenna A3, alternately, at a timing delayed by one symbol period, as illustrated in FIG. 17, in which timings $\phi_{j-3}$, $\phi_{j-2}$, $\phi_{j-1}$, $\phi_j$, $\phi_{j+1}$, - - - at which the respective phase compensations are carried out are indicated at each of the heads of the respective guard intervals GI, by using upward arrows, respectively.

Although the illustration is omitted, similarly to that illustrated in FIG. 2, the arithmetic and control processing circuit 22 illustrated in FIG. 16 encompasses: an antenna switching circuit 221 that generates signals for switching to any branch of the first antenna A1, the second antenna A2 and the third antenna A3 and transmits to the switch S; a symbol synchronization circuit 222 for establishing the symbol synchronization via the sliding correlation and the like; a complex correlation coefficient calculator 223 for calculating the complex correlation coefficient $\rho_2$ between the guard interval GI of the first antenna A1 and the copy-source interval T of the second antenna A2 and the complex correlation coefficient $\rho_3$ between the guard interval GI of the first antenna A1 and the copy-source interval T of the third antenna A3, from the demodulated signal of the receiver 21; a rotation angle calculator 224 for determining the rotation angles on the complex planes on the basis of the complex correlation coefficients calculated by the complex correlation coefficient calculator 223; and a phase shifting circuit 225 that generates the signals for shifting the phases of the reception signals from the second antenna A2 and the third antenna A3 to the opposite directions, the signals shift the phases by amount of rotation angles calculated by the rotation angle calculator 224, and the phase shifting circuit 225 transmits the signals to the first phase shifter 13a and the second phase shifter 13b.

As mentioned above, according to the triple-branch diversity reception device pertaining to the second embodiment, the phase compensation can be carried out at the order of the second antenna A2→the third antenna A3→the second antenna A2→the antenna A3 - - - , for each of the symbol periods $S_{j-1}$, $S_j$, $S_{j+1}$, $S_{j+2}$, - - - . Thus, even in the case of the triple antennas implemented by the first antenna A1, the second antenna A2 and the third antenna A3, a single receiver 21 can be used to carry out the phase compensations for two antennas-to-be-measured, by calculating the phase differences in the time-sharing scheme.

(Outline of Diversity Reception Device Pertaining to Third Embodiment)

In the first embodiment, the double-branch diversity reception device is exemplified, and in the second embodiment, the triple-branch diversity reception device is exemplified, respectively. However, the present invention can be applied to even a quadruple-branch diversity reception device. As described in the second embodiment, the number of the antennas may be three. However, in the case of the actual service, the quadruple-branch diversity reception device that uses the four antennas (one reference antenna and three antennas-to-be-measured) is employed in many cases.

Figure 18:
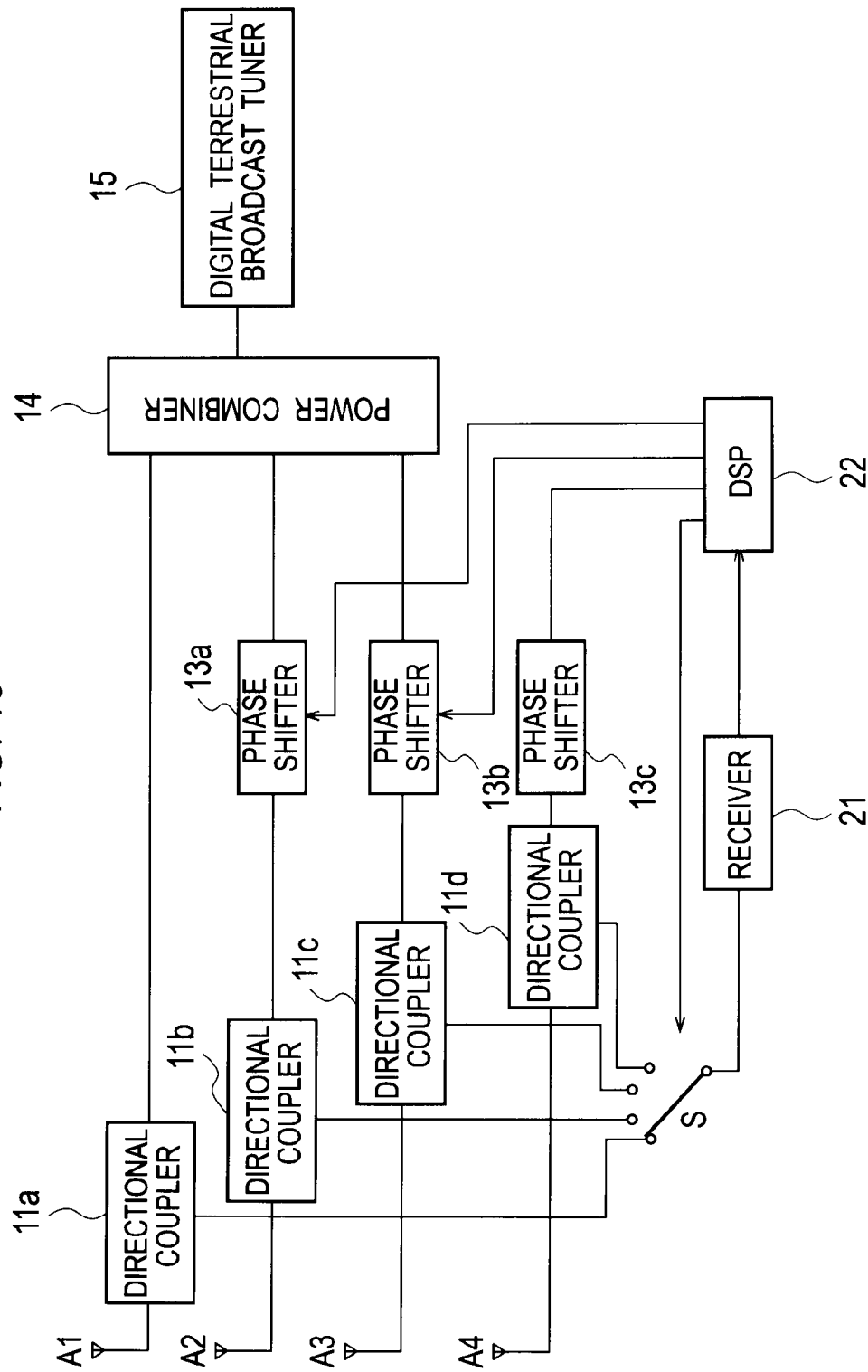
FIG. 18 is a schematic block-diagram describing an outline of a quadruple-branch diversity reception device pertaining to a third embodiment of the present invention.

That is, as illustrated in FIG. 18, a quadruple-branch diversity reception device pertaining to a third embodiment of the present invention encompasses: a first antenna A1 serving as a reference antenna; a second antenna A2 serving as a first antenna-to-be-measured; a third antenna A3 serving as a second antenna-to-be-measured; a third antenna A4 serving as a third antenna-to-be-measured: a power combiner 14 for combining electric powers of the OFDM signals respectively received by the first antenna A1, the second antenna A2, the third antenna A3 and the fourth antenna A4; a digital terrestrial broadcast tuner 15 connected to an output side of the power combiner 14; a switch S for sequentially switching between the branched output-port of the first antenna A1, the branched output-port of the second antenna A2, the branched output-port of the third antenna A3 and the branched output-port of the fourth antenna A4 for each of the symbol periods, in mid-stream of the effective symbol period of the OFDM signal; a receiver 21 that is connected to an output side of the switch S and demodulates the OFDM signal; a first phase shifter 13a that is connected to an output side of the second antenna A2 and shifts the phase of the OFDM signal received by the second antenna A2 and then transfers to the power combiner 14; a second phase shifter 13b that is connected to an output side of the third antenna A3 and shifts the phase of the OFDM signal received by the third antenna A3 and then transfers to the power combiner 14; a third phase shifter 13c that shifts the phase of the OFDM signal received by the fourth antenna A4 and then transfers to the power combiner 14; and an arithmetic and control processing circuit 22 that accepts the demodulated signals from the receiver 21 and transfers signals for shifting the phases, the signals shift the phases by amount of rotation angles, to the first phase shifter 13a, the second phase shifter 13b and the third phase shifter 13, respectively. The first directional coupler 11a is connected to the output side of the first antenna A1, and a part of the outputs of the first antenna A1 is branched to the switch S side. The second directional coupler 11b is connected to the output side of the second antenna A2, and a part of the outputs of the second antenna A2 is branched to the switch S side. The third directional coupler 11c is connected to the output side of the third antenna A3, and a part of the outputs of the third antenna A3 is branched to the switch S side. A fourth directional coupler 11d is connected to the output side of the fourth antenna A4, and a part of the outputs of the fourth antenna A4 is branched to the switch S side. To the power combiner 14, the part of the outputs of the first antenna A1 is entered through the first directional coupler 11, the part of the outputs of the second antenna A2 is entered through the second directional coupler 11b and the first phase shifter 13a, the part of the outputs of the third antenna A3 is entered through the third directional coupler 11c and the second phase shifter 13b, and the part of the outputs of the fourth antenna A4 is entered through the fourth directional coupler 11d and the third phase shifter 13c. In the quadruple-branch diversity reception device pertaining to the third embodiment, the number of the receiver 12 is one, and the receiver 12 is connected through the switch S to the first antenna A1, the second antenna A2, the third antenna A3 and the fourth antenna A4, in the time-sharing scheme.

As the arithmetic and control processing circuit 22, it is possible to use the microprocessor such as the DSP or the like. Then, the signals of the receiver 21 are AD-converted and entered to the arithmetic and control processing circuit 22, and the output signals of the arithmetic and control processing circuit 22 are DA-converted and entered to the first phase shifter 13a, the second phase shifter 13b and the third phase shifter 13c, respectively. Similarly to the description of the diversity reception device pertaining to the first embodiment, as the first antenna A1, the second antenna A2, the third antenna A3 and the fourth antenna A4, it is possible to use the known various antennas. Also, in the digital terrestrial broadcast tuner 15, since the known circuit configuration can be used, its detailed description is omitted.

Figure 19:
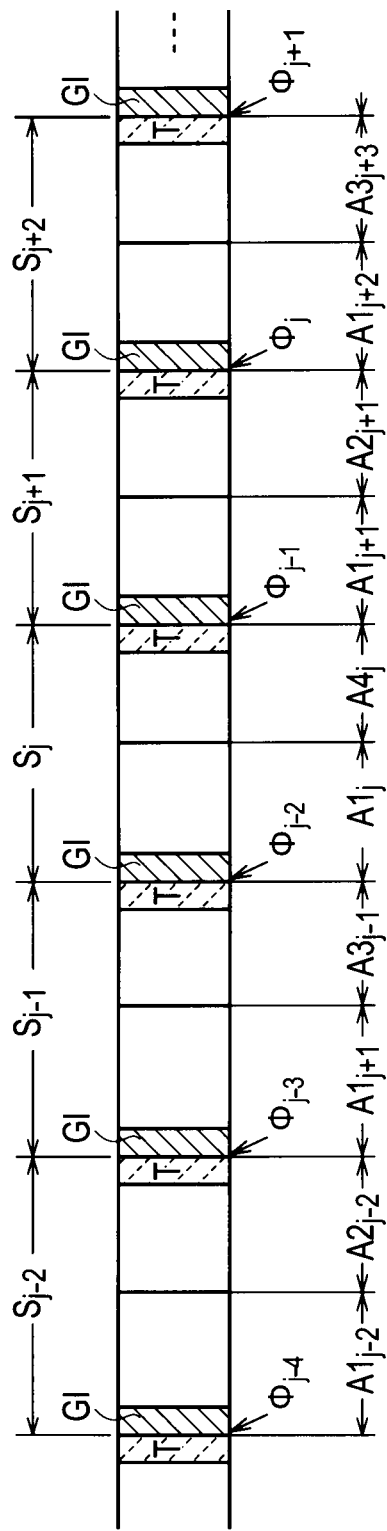
FIG. 19 is a time chart describing a behavior of the quadruple-branch diversity reception device pertaining to the third embodiment, which changes connections between the first antenna and the second antenna in one symbol period, and changes connections between the first antenna and the third antenna in the next symbol period, and changes connections between the first antenna and a fourth antenna in a third symbol period, and sequentially calculates the complex correlation coefficient between the guard interval of the first antenna and the copy-source interval of the second antenna, the complex correlation coefficient between the guard interval of the first antenna and the copy-source interval of the third antenna, and the complex correlation coefficient between the guard interval of the first antenna and the copy-source interval of the fourth antenna.

As illustrated in FIG. 19, the OFDM signals in which the guard intervals GI are provided in the respective symbol periods $S_{j-2}$, $S_{j-1}$, $S_j$, $S_{j+1}$, $S_{j+2}$, - - - of the inverse-discrete-Fourier-transformed signals are entered to the first antenna A1, the second antenna A2, the third antenna A3 and the fourth antenna A4. The period in which the interval length of the guard interval GI is subtracted from the interval length of each of the symbol periods $S_{j-2}$, $S_{j-1}$, $S_j$, $S_{j+1}$, $S_{j+2}$, - - - becomes the effective symbol period (observation window period). Each of the guard intervals GI is just copied cyclically without any change, in which the waveform of the copy-source interval T in the second half of the effective symbol period in each of the symbol periods $S_{j-2}$, $S_{j-1}$, $S_j$, $S_{j+1}$, $S_{j+2}$, is defined as the dummy signal. Then, in the symbol period $S_{j-2}$, the switching between the first antenna A1 and the second antenna A2 is carried out, and the complex correlation coefficient $\rho_2$ between the guard interval GI of the first antenna A1 and the copy-source interval T of the second antenna A2 is calculated. In the next symbol period $S_{j-1}$, the switching between the first antenna A1 and the third antenna A3 is carried out, and the complex correlation coefficient $\rho_3$ between the guard interval GI of the first antenna A1 and the copy-source interval T of the third antenna A3 is calculated. In the next symbol period $S_j$, the switching between the first antenna A1 and the fourth antenna A4 is carried out, and a complex correlation coefficient $\rho_4$ between the guard interval GI of the first antenna A1 and the copy-source interval T of the fourth antenna A4 is calculated. In the next symbol period $S_{j+1}$, the switching between the first antenna A1 and the second antenna A2 is carried out, and the complex correlation coefficient $\rho_3$ between the guard interval GI of the first antenna A1 and the copy-source interval T of the second antenna A2 is calculated. In the next symbol period $S_{j+2}$, the switching between the first antenna A1 and the third antenna A3 is carried out, and the complex correlation coefficient $\rho_3$ between the guard interval GI of the first antenna A1 and the copy-source interval T of the third antenna A3 is calculated. Then, on the basis of the complex correlation coefficients, the rotation angles on the complex plane are sequentially determined to compensate the phases of the reception signals of each of the second antenna A2, the third antenna A3 and the fourth antenna A4. As for the timing when the compensation is carried out, the phase compensation amount is calculated in a symbol period next to the symbol period in which the data is obtained, and the phase shifter is controlled at the head of the next symbol period, and the phase compensation is carried out. That is, in such a way that the timings $\phi_{j-4}$, $\phi_{j-3}$, $\phi_{j-2}$, $\phi_{j-1}$, $\phi_j$, $\phi_{j+1}$, - - - at which the respective phase compensations are carried out are indicated at the heads of the respective guard intervals GI in FIG. 19 by using the upward arrows, in the quadruple-branch diversity reception device, the phases of the reception signals of each of the second antenna A2, the third antenna A3 and the fourth antenna A4 are sequentially compensated at timings delayed by one symbol period, after each processes of the data obtainments.

Although the illustration is omitted, similarly to that illustrated in FIG. 2, the arithmetic and control processing circuit 22 illustrated in FIG. 18 encompasses: an antenna switching circuit 221 that generates signals for switching to any branch of the first antenna A1, the second antenna A2, the third antenna A3 and the fourth antenna A4 and transmits to the switch S; a symbol synchronization circuit 222 for establishing the symbol synchronization via sliding correlation and the like; a complex correlation coefficient calculator 223 for calculating the complex correlation coefficient $\rho_2$ between the guard interval GI of the first antenna A1 and the copy-source interval T of the second antenna A2, the complex correlation coefficient $\rho_3$ between the guard interval GI of the first antenna A1 and the copy-source interval T of the third antenna A3 and a complex correlation coefficient $\rho_4$ between the guard interval GI of the first antenna A1 and the copy-source interval T of the fourth antenna A4, from demodulated signals of the receiver 21; a rotation angle calculator 224 for determining the rotation angle on the complex plane on the basis of the complex correlation coefficients calculated by the complex correlation coefficient calculator 223; and a phase shifting circuit 225 that generates the signals for shifting the phases of the reception signals from the second antenna A2, the third antenna A3 and the fourth antenna A4 to the opposite directions, the signals shift the phases by amount of rotation angles calculated by the rotation angle calculator 224, and the phase shifting circuit 225 transmits the signals to the first phase shifter 13a, the second phase shifter 13b and the third phase shifter 13c, respectively.

As mentioned above, according to the quadruple-branch diversity reception device pertaining to the third embodiment, the phase compensation can be sequentially carried out at an order of the second antenna A2→the third antenna A3→the fourth antenna A4→the second antenna A2→the antenna A3 - - - , for each of the symbol periods $S_{j-2}$, $S_{j-1}$, $S_j$, $S_{j+1}$, $S_{j+2}$, Thus, even in the case of the four antennas implemented by the first antenna A1, the second antenna A2, the third antenna A3 and the fourth antenna A4, a single receiver 21 can be used to carry out the phase compensations for the three antennas-to-be-measured, by calculating the phase differences.

(Outline of Diversity Reception Device Pertaining to Fourth Embodiment)

Because of the duplication, the illustration of the configuration is omitted. However, similarly to that illustrated in FIG. 18, the quadruple-branch diversity reception device pertaining to the fourth embodiment of the present invention encompasses a first antenna A1 serving as a reference antenna, a second antenna A2 serving as a first antenna-to-be-measured, a third antenna A3 serving as a second antenna-to-be-measured and a fourth antenna A4 serving as a third antenna-to-be-measured. Then, to a power combiner 14, a part of the outputs of the first antenna A1 is entered through a first directional coupler 11a, a part of the outputs of the second antenna A2 is entered through a second directional coupler 11b and a first phase shifter 13a, a part of the outputs of a third antenna A3 is entered through a third directional coupler 11c and a second phase shifter 13b, and a part of the outputs of a fourth antenna A4 is entered through a fourth directional coupler 11d and a third phase shifter 13c. A receiver 12 is connected through a switch S to the first antenna A1, the second antenna A2, the third antenna A3 and the fourth antenna A4.

In the quadruple-branch diversity reception device pertaining to the third embodiment, continuous three symbol periods $S_{j-2}$, $S_{j-1}$, $S_j$ were used to calculate the phase differences in the time-sharing scheme and perform the phase compensations on the three antennas-to-be-measured, at the order of the second antenna A2→the third antenna A3→the fourth antenna A4→. Thus, in the phase compensations for the second antenna A2, the third antenna A3 and the fourth antenna A4, the delay corresponding to the maximum of three symbol periods has been generated after the data obtainment. On the contrary, in the quadruple-branch diversity reception device pertaining to the fourth embodiment, the phase compensations are performed on the three antennas-to-be-measured, namely, the second antenna A2, the third antenna A3 and the fourth antenna A4, in one symbol period $S_j$.

Specifically, as illustrated in FIG. 20, according to the quadruple-branch diversity reception device pertaining to the fourth embodiment, the guard interval GI is received by the first antenna (the reference antenna) A1. At a timing t12 prior to the copy-source interval T, the path is switched from the first antenna A1 to the second antenna A2. At a timing $t_{23}$ in mid-stream of the copy-source interval T, the path is switched from the second antenna A2 to the third antenna A3. At a timing $t_{34}$ in mid-stream of the copy-source interval T, the path is switched from the third antenna A3 to the fourth antenna A4. At a timing $t_{41}$ in mid-stream of the copy-source interval T, the path is switched from the fourth antenna A4 to the first antenna A1. Then, during the copy-source interval T, the signals from the second antenna A2, the third antenna A3 and the fourth antenna A4 are received in the time-sharing scheme. Then, the phase compensations are carried out by obtaining the correlations $\rho_2$, $\rho_3$ and $\rho_4$ to the portions of the corresponding guard intervals GI, for the respective reception durations of the second antenna A2, the third antenna A3 and the fourth antenna A4 in the copy-source interval T. That is, as illustrated in FIG. 20, the complex correlation coefficient $\rho_2$ is calculated between the first divided-guard interval and the copy-source interval T of the second antenna A2, and the complex correlation coefficient $\rho_3$ is calculated between the second divided-guard interval and the copy-source interval T of the third antenna A3, and the complex correlation coefficient $\rho_4$ is further calculated between the third divided-guard interval and the copy-source interval T of the fourth antenna A4, here, the first, second and third divided-guard intervals are provided by dividing the guard interval GI into three segments. Although each of the durations in which the correlations $\rho_2$, $\rho_3$ and $\rho_4$ are calculated for the second antenna A2, the third antenna A3 and the fourth antenna A4, respectively, becomes about ⅓ as compared with the third embodiment, the duration serves as an enough interval length that can facilitate sufficient phase compensation. According to the quadruple-branch diversity reception device pertaining to the fourth embodiment, the phase compensations for the three antennas-to-be-measured can be carried out in a single symbol period $S_j$. Thus, the quadruple-branch diversity reception device can follow the faster fading environment.

In the quadruple-branch diversity reception device pertaining to the fourth embodiment, the power combiner 14 combines the signals from the reference antenna A1 and the signals of the plurality of antennas A2, A3 and A4 to be measured in which their phases are shifted by the three phase shifters 13a, 13b and 13c. When the signals from the reference antenna A1 and the signals from the antenna A2, A3 and A4 to be measured are normally correlation-calculated, the signals may be simply combined by the power combiner 14. However, in the case that the correlation calculations $\rho_2$, $\rho_3$ and $\rho_4$ are not normally calculated appropriately, when the signals are combined by the power combiner 14, the signals are degraded on the contrary. Thus, the quadruple-branch diversity reception device pertaining to the fourth embodiment is so designed that improper signals from the antenna-to-be-measured, in which the correlation coefficients $\rho_2$, $\rho_3$ and $\rho_4$ are levels of a threshold (for example, 0.3) or less, are not combined. When the correlation coefficients of all of the antennas A2, A3 and A4 to be measured are the threshold or less, the combination of signals by the power combiner 14 is not carried out, and an antenna which provide signals of the highest magnitude among the four antennas A1, A2, A3 and A4 is selected.

(Other Embodiment)

As mentioned above, in the present invention, for convenience, the double-branch diversity reception device is described in the first embodiment, the triple-branch diversity reception device is described in the second embodiment, and the quadruple-branch diversity reception device is described in the third and fourth embodiments, respectively. However, the discussions and drawings that implement a part of the disclosure in this specification should not be understood to limit the scope of present invention. From this disclosure, various variations, implementations and operational techniques would be evident for person ordinary skilled in the art.

For example, the present invention can be naturally applied to a multiple-branch diversity reception device that has plural N branches which are more than quadruple-branches. That is, although the illustration is omitted, the multiple-branch diversity reception device can be typically described such that a reference antenna serving as a single reference antenna and plural (N−1) antennas-to-be-measured, which implement plural N branches (here, "N" is any arbitrary positive integer equal to or larger than two). Even in the case of the N-branch diversity reception device, similarly to FIG. 1, the configuration of the N-branch diversity reception device encompasses: a power combiner for combining the electric powers of the OFDM signals respectively received by the reference antenna and (N−1) antennas-to-be-measured; a digital terrestrial broadcast tuner connected to an output side of the power combiner; a switch configured to change connections between a branched output-port of the reference antenna and a branched output-port of any of the branches in the (N−1) antennas-to-be-measured (hereafter, referred to as "branches-to-be-measured" for each of symbol periods, in mid-stream of the effective symbol period of the OFDM signals; a receiver that is connected to an output side of the switch and demodulates the OFDM signals; (N−1) phase shifters that are inserted into the (N−1) branches-to-be-measured, respectively, and shift the phases of the OFDM signals respectively received by the (N−1) antennas-to-be-measured, and then, the phase shifters transfer the OFDM signals to the power combiner, respectively; and an arithmetic and control processing circuit.

Then, the arithmetic and control processing circuit in the N-branch diversity reception device executes a sequence of processes, which encompasses: accepting demodulated signals from the receiver; calculating the complex correlation coefficient between a guard interval of the reference antenna and any of the respective copy-source intervals in the branches-to-be-measured for each of symbol periods so as to determine rotation angles on the complex plane, on the basis of the complex correlation coefficients, and then transferring signals for shifting the phase, the signals shifting the phases by amount of rotation angles, to phase shifters of branches in the corresponding antenna-to-be-measured, on all of the (N−1) branches-to-be-measured. In this way, when the number N of the branches is greater than two, sequentially, the correlations between the reference antenna and the plural (N−1) antennas-to-be-measured may be respectively determined to perform the phase settings on the respective branches. For this reason, in the case of the N-branch diversity reception device, the delay corresponding to a maximum of N symbol periods is generated in the phase compensations in all of the N branches, in view of required one symbol period for the compensation-amount calculation. As mentioned above, according to the N-branch diversity reception device pertaining to the other embodiments of the present invention, even if the number of the antennas is N, a single receiver 21 can be used to calculate the phase differences in the time-sharing scheme, and phase compensations on (N−1) antennas-to-be-measured can be established.

Also, in the quadruple-branch diversity reception device pertaining to the fourth embodiment, an example such that, when improper signals from the antenna-to-be-measured, in which the correlation coefficients $\rho_2$, $\rho_3$ and $\rho_4$ are the threshold (for example, 0.3) or less, are not combined, and that an antenna having the highest signals magnitude among the four antennas A1, A2, A3 and A4 is selected is described. However, the methodology such that improper signals from antenna-to-be-measured, in which the respective correlation coefficients are the threshold or less, are not combined is similarly effective even for the double-branch diversity reception device described in the first embodiment, the triple-branch diversity reception device described in the second embodiment and the triple-branch diversity reception device described in the third embodiment.

In this way, the present invention naturally includes various embodiments that are not described herein. Thus, the technical scope of the present invention should be determined only by the subject-matter-to-define-the-invention according to the disclosure of claims, which are reasonable from the above descriptions.

The invention claimed is:

1. A diversity reception device, comprising:
a first antenna serving as a reference antenna;
a second antenna serving as an antenna-to-be-measured;
a power combiner configured to combine electric powers of OFDM signals respectively, each of the OFDM signals being received by the first and second antennas;
a digital terrestrial broadcast tuner connected to an output side of the power combiner;
a switch configured to change connections between branched output-ports of the first and second antennas, in mid-stream of effective symbol periods, the effective symbol periods are assigned respectively in each of symbol periods of the OFDM signals;
a receiver connected to an output side of the switch, configured to demodulate the OFDM signals;
a phase shifter connected to an output side of the second antenna, configured to shift phases of the OFDM signals received by the second antenna, and to transfer the phase-shifted OFDM signals to the power combiner; and
an arithmetic and control processing circuit, after accepting the demodulated OFDM signals, configured to calculate complex correlation coefficient between a guard interval, which is assigned in each of the symbol periods associated with the first antenna, and a copy-source interval, which is assigned in each of the symbol periods associated with the second antenna, and to determine rotation angle on a complex plane on the basis of the complex correlation coefficient, and to transfer phase-shift signal to the phase shifter so that the phase shifter can shift the phase by amount of the rotation angle.

2. The diversity reception device of claim 1, further comprising:
a first directional coupler inserted into a part of a transmission route from the first antenna to the power combiner, configured to branch a part of the OFDM signals, which are received by the first antenna, toward the switch; and
a second directional coupler inserted into a part of a transmission route from the second antenna to the phase shifter, configured to branch a part of the OFDM signals, which are received by the second antenna, toward the switch.

3. A diversity reception device, comprising:
a reference antenna;
a plurality of antennas-to-be-measured;
a power combiner configured to combine electric powers of OFDM signals respectively, each of the OFDM signals being received by the reference antenna and the plurality of antennas-to-be-measured;
a digital terrestrial broadcast tuner connected to an output side of the power combiner;
a switch configured to change connections between branched output-ports of the reference antenna and any of the plurality of antennas-to-be-measured, in mid-stream of effective symbol periods, the effective symbol periods are assigned respectively in each of symbol periods of the OFDM signals;
a receiver connected to an output side of the switch, configured to demodulate the OFDM signals;
a plurality of phase shifters connected respectively to output sides of the plurality of antennas-to-be-measured, configured to shift respectively phases of the OFDM signals, which are received by the plurality of antennas-to-be-measured, and to transfer the phase-shifted OFDM signals to the power combiner, respectively; and
an arithmetic and control processing circuit configured to perform a sequence of processes against the plurality of antennas-to-be-measured, respectively, after accepting the demodulated OFDM signals, the sequence of processes includes:
calculating complex correlation coefficient between a guard interval, which is assigned in each of the symbol periods associated with the reference antenna, and a copy-source interval, which is assigned in each of the symbol periods associated with any of corresponding antennas-to-be-measured,
determining rotation angle on a complex plane on the basis of the complex correlation coefficient, and
transferring phase-shift signal to a phase shifter connected to corresponding antennas-to-be-measured so that the phase shifter connected to the corresponding antennas-to-be-measured can shift the phase by amount of the rotation angle.

4. The diversity reception device of claim 3, further comprising:
a first directional coupler inserted into a part of a transmission route from the reference antenna to the power combiner, configured to branch a part of the OFDM signals, which are received by the reference antenna, toward the switch; and
a plurality of second directional couplers inserted respectively into a part of respective transmission routes from the plurality of antennas-to-be-measured to the phase shifter, configured to branch a part of the corresponding OFDM signals, which are respectively received by the plurality of antennas-to-be-measured, toward the switch, respectively.

5. The diversity reception device of claim 4, wherein, as N is a positive integer equal to or greater than three, the number of the plurality of antennas-to-be-measured is set as (N−1), the arithmetic and control processing circuit sequentially carries out the sequence of processes with continuous (N−1) symbol periods, by calculating sequentially complex correlation coefficients between a guard interval, which is assigned in each of the symbol periods associated with the reference antenna, and a copy-source interval, which is assigned in each of the symbol periods associated with any of corresponding antennas-to-be-measured, and sequentially determining rotation angles on the complex plane on the basis of the complex correlation coefficients.

6. The diversity reception device of claim 4, wherein, as N is a positive integer equal to or greater than three, the number of the plurality of antennas-to-be-measured is set as (N−1), the arithmetic and control processing circuit sequentially carries out the sequence of processes, after dividing each of the guard interval and the copy-source interval, which are assigned respectively in the symbol periods, into (N−1) segments, by calculating complex correlation coefficients between the reference antenna and any of the plurality of antennas-to-be-measured with each of the divided guard intervals and the divided copy-source intervals, and by sequentially determining rotation angles on the complex plane on the basis of the complex correlation coefficients.

7. The diversity reception device of claim 4, wherein the arithmetic and control processing circuit does not combine the signals of the antennas-to-be-measured, when the correlation coefficients of the signals are equal to or less than a threshold.

8. The diversity reception device of claim 3, wherein, as N is a positive integer equal to or greater than three, the number of the plurality of antennas-to-be-measured is set as (N−1), the arithmetic and control processing circuit sequentially carries out the sequence of processes with continuous (N−1) symbol periods, by calculating sequentially complex correlation coefficients between a guard interval, which is assigned in each of the symbol periods associated with the reference antenna, and a copy-source interval, which is assigned in each of the symbol periods associated with any of corresponding antennas-to-be-measured, and sequentially determining rotation angles on the complex plane on the basis of the complex correlation coefficients.

9. The diversity reception device of claim 8, wherein the arithmetic and control processing circuit does not combine the signals of the antennas-to-be-measured, when the correlation coefficients of the signals are equal to or less than a threshold.

10. The diversity reception device of claim 3, wherein, as N is a positive integer equal to or greater than three, the number of the plurality of antennas-to-be-measured is set as (N−1), the arithmetic and control processing circuit sequentially carries out the sequence of processes, after dividing each of the guard interval and the copy-source interval, which are assigned respectively in the symbol periods, into (N−1) segments, by calculating complex correlation coefficients between the reference antenna and any of the plurality of antennas-to-be-measured with each of the divided guard intervals and the divided copy-source intervals, and by sequentially determining rotation angles on the complex plane on the basis of the complex correlation coefficients.

11. The diversity reception device of claim 10, wherein the arithmetic and control processing circuit does not combine the signals of the antennas-to-be-measured, when the correlation coefficients of the signals are equal to or less than a threshold.

12. The diversity reception device of claim 3, wherein the arithmetic and control processing circuit does not combine the signals of the antennas-to-be-measured, when the correlation coefficients of the signals are equal to or less than a threshold.

* * * * *

UNITED STATES PATENT AND TRADEMARK OFFICE
CERTIFICATE OF CORRECTION

PATENT NO.       : 8,437,438 B2
APPLICATION NO.  : 13/382566
DATED            : May 7, 2013
INVENTOR(S)      : Yoshihiko Kuwahara Page 1 of 1

It is certified that error appears in the above-identified patent and that said Letters Patent is hereby corrected as shown below:

On the title page, Item (86), the PCT information is incorrect. Item (86) should read:

--(86) PCT No.:      PCT/JP2010/061558

§ 371 (c)(1),
(2), (4) Date:   Jan. 6, 2012--

Signed and Sealed this
Twenty-fifth Day of June, 2013

Teresa Stanek Rea
*Acting Director of the United States Patent and Trademark Office*